US011731047B2

(12) United States Patent
Moskowitz et al.

(10) Patent No.: US 11,731,047 B2
(45) Date of Patent: Aug. 22, 2023

(54) SYSTEMS AND METHODS FOR MANIPULATION OF OUTCOMES FOR VIRTUAL SPORTING EVENTS

(71) Applicant: Fayble, LLC, Oakland, CA (US)

(72) Inventors: Alan S. Moskowitz, Oakland, CA (US); Bidit Acharya, Oakland, CA (US); Matthew Benjamin Naranjo, Morgan Hill, CA (US); Susan Elizabeth Wilson, San Diego, CA (US)

(73) Assignee: FAYBLE, LLC, Oakland, CA (US)

( * ) Notice: Subject to any disclaimer, the term of this patent is extended or adjusted under 35 U.S.C. 154(b) by 305 days.

(21) Appl. No.: 16/817,381

(22) Filed: Mar. 12, 2020

(65) Prior Publication Data

US 2020/0289928 A1   Sep. 17, 2020

Related U.S. Application Data

(60) Provisional application No. 62/817,410, filed on Mar. 12, 2019.

(51) Int. Cl.
*A63F 13/47* (2014.01)
*A63F 13/828* (2014.01)
*A63F 13/52* (2014.01)

(52) U.S. Cl.
CPC .............. *A63F 13/47* (2014.09); *A63F 13/52* (2014.09); *A63F 13/828* (2014.09); *A63F 2300/632* (2013.01); *A63F 2300/8052* (2013.01)

(58) Field of Classification Search
CPC ........ A63F 13/47; A63F 13/52; A63F 13/828; A63F 2300/632; A63F 2300/8052; A63F 13/48; A63F 13/49; A63F 13/50
See application file for complete search history.

(56) References Cited

U.S. PATENT DOCUMENTS

| | | | | | |
|---|---|---|---|---|---|
| 4,093,223 | A | * | 6/1978 | Wilke | A63F 3/00028 463/31 |
| 4,527,798 | A | * | 7/1985 | Siekierski | G07F 17/3202 708/250 |
| 4,918,603 | A | * | 4/1990 | Hughes | G09B 19/00 463/4 |
| 4,977,503 | A | * | 12/1990 | Rudnick | G06F 15/0283 700/91 |

(Continued)

*Primary Examiner* — David L Lewis
*Assistant Examiner* — Matthew D Hoel
(74) *Attorney, Agent, or Firm* — Kwan & Olynick LLP

(57) ABSTRACT

Provided are systems and processes for manipulating outcomes of virtual sporting events. An example method comprises identifying a set of valid event segments for a given time segment of a virtual sporting event. An outcome category is determined for each of the valid event segments, which indicates an outcome of a play corresponding to the valid event segment. Audience input is obtained over a network from a plurality of client devices associated with a plurality of audience members. The audience input indicates a desired outcome for the given time segment. A valid event segment is then selected as a virtual event segment for the given time segment based on at least the desired outcome. Selection of the virtual event segment may comprise biasing the set of valid event segments to obtain a predetermined proportion of valid event segments with outcome categories corresponding to the desired outcome.

19 Claims, 14 Drawing Sheets

(56) References Cited

U.S. PATENT DOCUMENTS

| | | | | |
|---|---|---|---|---|
| 5,018,736 A * | 5/1991 | Pearson | A63F 3/081 |
| | | | 379/92.03 |
| 5,263,723 A * | 11/1993 | Pearson | A63F 3/081 |
| | | | 463/40 |
| 5,593,349 A * | 1/1997 | Miguel | G07F 17/32 |
| | | | 463/30 |
| 5,636,920 A * | 6/1997 | Shur | G06Q 10/06 |
| | | | 700/91 |
| 5,713,793 A * | 2/1998 | Holte | A63F 3/081 |
| | | | 463/9 |
| 5,769,714 A * | 6/1998 | Wiener | A63F 13/812 |
| | | | 273/108.3 |
| 5,794,210 A * | 8/1998 | Goldhaber | G06Q 30/0207 |
| | | | 705/14.69 |
| 5,846,132 A * | 12/1998 | Junkin | A63F 3/081 |
| | | | 463/42 |
| 5,848,397 A * | 12/1998 | Marsh | G06Q 30/0601 |
| | | | 705/30 |
| 5,860,862 A * | 1/1999 | Junkin | G06Q 10/107 |
| | | | 463/40 |
| 5,890,906 A * | 4/1999 | Macri | A63F 13/42 |
| | | | 463/3 |
| 5,971,854 A * | 10/1999 | Pearson | A63F 3/081 |
| | | | 463/41 |
| 5,971,862 A * | 10/1999 | Yates | A63B 57/0006 |
| | | | 473/137 |
| 5,991,735 A * | 11/1999 | Gerace | H04L 12/1859 |
| | | | 705/7.29 |
| 6,015,344 A * | 1/2000 | Kelly | A63F 3/081 |
| | | | 463/16 |
| 6,110,041 A * | 8/2000 | Walker | G07F 17/32 |
| | | | 463/20 |
| 6,135,881 A * | 10/2000 | Abbott | A63F 13/80 |
| | | | 273/108.3 |
| 6,152,821 A * | 11/2000 | Nakagawa | A63F 13/10 |
| | | | 463/2 |
| 6,155,924 A * | 12/2000 | Nakagawa | A63F 13/58 |
| | | | 463/2 |
| 6,183,259 B1 * | 2/2001 | Macri | G09B 19/22 |
| | | | 463/3 |
| 6,193,610 B1 * | 2/2001 | Junkin | G06Q 10/107 |
| | | | 463/40 |
| 6,371,855 B1 * | 4/2002 | Gavriloff | A63F 13/12 |
| | | | 463/9 |
| 6,406,371 B1 * | 6/2002 | Baba | A63F 13/95 |
| | | | 463/43 |
| 6,579,183 B1 * | 6/2003 | Hiromi | A63F 13/52 |
| | | | 463/31 |
| 6,597,960 B2 * | 7/2003 | Spector | A63B 71/06 |
| | | | 700/91 |
| 6,669,565 B2 * | 12/2003 | Liegey | G07F 17/3288 |
| | | | 463/9 |
| 6,679,774 B2 * | 1/2004 | Fujioka | A63F 13/822 |
| | | | 463/44 |
| 6,775,580 B2 * | 8/2004 | Jira | A63F 9/24 |
| | | | 463/2 |
| 6,837,789 B2 * | 1/2005 | Garahi | G07F 17/3288 |
| | | | 463/30 |
| 6,837,791 B1 * | 1/2005 | McNutt | G07F 17/32 |
| | | | 463/28 |
| 7,001,279 B1 * | 2/2006 | Barber | H04N 7/163 |
| | | | 463/40 |
| 7,058,592 B1 * | 6/2006 | Heckerman | G06Q 30/0269 |
| | | | 705/14.52 |
| 7,136,871 B2 * | 11/2006 | Ozer | G06Q 30/0269 |
| | | | 707/999.102 |
| 7,351,150 B2 * | 4/2008 | Sanchez | A63F 13/86 |
| | | | 463/40 |
| 7,472,102 B1 * | 12/2008 | Heckerman | G06Q 10/087 |
| | | | 706/45 |
| 7,548,242 B1 * | 6/2009 | Hughes | G07F 17/3288 |
| | | | 463/31 |
| 7,614,944 B1 * | 11/2009 | Hughes | A63F 13/85 |
| | | | 463/4 |
| 7,699,701 B2 * | 4/2010 | Corbo | G07F 17/3288 |
| | | | 463/25 |
| 7,988,560 B1 * | 8/2011 | Heller | A63F 9/24 |
| | | | 463/40 |
| 8,099,182 B1 * | 1/2012 | Kasten | A63F 13/828 |
| | | | 463/9 |
| 8,176,518 B1 * | 5/2012 | Junkin | A63F 13/46 |
| | | | 725/9 |
| 8,340,794 B1 * | 12/2012 | Trdinich | A63F 13/46 |
| | | | 463/9 |
| 8,366,551 B2 * | 2/2013 | Thomas | A63F 13/795 |
| | | | 463/42 |
| 8,460,078 B2 * | 6/2013 | Moore | A63F 13/65 |
| | | | 463/40 |
| 8,509,929 B1 * | 8/2013 | Hughes | A63F 13/20 |
| | | | 700/91 |
| 8,538,563 B1 * | 9/2013 | Barber | G07F 17/3276 |
| | | | 463/28 |
| 8,606,380 B2 * | 12/2013 | Trdinich | A63F 13/828 |
| | | | 463/9 |
| 8,622,797 B2 * | 1/2014 | Noonan | A63F 13/828 |
| | | | 463/9 |
| 8,670,847 B2 * | 3/2014 | Sloan | A63F 13/46 |
| | | | 700/91 |
| 8,684,827 B2 * | 4/2014 | Asher | G06Q 40/04 |
| | | | 700/91 |
| 8,702,504 B1 * | 4/2014 | Hughes | H04N 21/8586 |
| | | | 463/31 |
| 8,851,998 B2 * | 10/2014 | Pawson | A63F 13/828 |
| | | | 463/42 |
| 8,888,584 B2 * | 11/2014 | Cohen | A63F 13/798 |
| | | | 700/91 |
| 8,951,107 B2 * | 2/2015 | Sloan | A63F 13/85 |
| | | | 463/9 |
| 9,079,105 B2 * | 7/2015 | Kim | A63F 13/537 |
| 9,138,652 B1 * | 9/2015 | Thompson | H04N 21/237 |
| 9,358,462 B2 * | 6/2016 | Hughes | A63F 13/12 |
| 9,440,152 B2 * | 9/2016 | Thompson | A63F 13/79 |
| 9,463,388 B2 * | 10/2016 | Thompson | H04N 21/812 |
| 9,474,960 B1 * | 10/2016 | Lundschen | A63F 13/30 |
| 9,589,418 B2 * | 3/2017 | Givant | G07F 17/3276 |
| 9,731,193 B2 * | 8/2017 | Hughes | A63F 13/20 |
| 9,868,056 B2 * | 1/2018 | Kehoe | A63F 13/828 |
| 9,889,382 B2 * | 2/2018 | Thompson | A63F 13/828 |
| 10,029,183 B2 * | 7/2018 | Lundschen | A63F 13/828 |
| 10,105,595 B2 * | 10/2018 | Lempel | A63F 13/69 |
| 10,165,330 B2 * | 12/2018 | Pino, Jr. | H04N 21/47205 |
| 10,293,263 B2 * | 5/2019 | Thompson | A63F 13/67 |
| 10,391,389 B2 * | 8/2019 | Hughes | A63F 13/20 |
| 10,424,164 B2 * | 9/2019 | Kehoe | H04L 67/125 |
| 10,452,247 B2 * | 10/2019 | Stephens | H04L 51/56 |
| 10,460,568 B2 * | 10/2019 | Givant | G07F 17/3223 |
| 10,524,008 B2 * | 12/2019 | Green | A63F 13/52 |
| 10,709,983 B1 * | 7/2020 | Dills | A63F 13/816 |
| 10,926,178 B1 * | 2/2021 | Batty | A63F 13/47 |
| 11,037,400 B2 * | 6/2021 | Cohen | G06F 16/9535 |
| 11,040,274 B2 * | 6/2021 | Hughes | A63F 13/828 |
| 11,079,920 B2 * | 8/2021 | Stephens | H04L 67/55 |
| 11,087,595 B2 * | 8/2021 | Nelson | G07F 17/3246 |
| 11,087,596 B2 * | 8/2021 | Nelson | G07F 17/3258 |
| 11,232,681 B2 * | 1/2022 | Juan | G07F 17/3288 |
| 11,270,556 B2 * | 3/2022 | Givant | G07F 17/3223 |
| 11,273,382 B2 * | 3/2022 | Mix | A63F 13/46 |
| 11,285,383 B2 * | 3/2022 | Buhr | G06Q 50/01 |
| 11,410,502 B2 * | 8/2022 | Huke | G07F 17/3262 |
| 2001/0036853 A1 * | 11/2001 | Thomas | G06Q 50/34 |
| | | | 463/17 |
| 2002/0023002 A1 * | 2/2002 | Staehelin | G06Q 30/0269 |
| | | | 705/14.66 |
| 2002/0046099 A1 * | 4/2002 | Frengut | G06Q 30/0273 |
| | | | 705/14.69 |
| 2002/0059094 A1 * | 5/2002 | Hosea | H04N 7/17318 |
| | | | 348/E7.071 |
| 2002/0068633 A1 * | 6/2002 | Schlaifer | G07F 17/3244 |
| | | | 463/43 |

(56) References Cited

U.S. PATENT DOCUMENTS

| | | | |
|---|---|---|---|
| 2002/0107073 A1* | 8/2002 | Binney | A63F 13/12 463/1 |
| 2002/0160835 A1* | 10/2002 | Fujioka | A63F 13/10 463/31 |
| 2003/0054885 A1* | 3/2003 | Pinto | A63F 13/12 463/42 |
| 2004/0117831 A1* | 6/2004 | Ellis | H04N 21/4755 348/E7.071 |
| 2006/0247052 A1* | 11/2006 | Baba | A63F 13/52 463/43 |
| 2008/0039210 A1* | 2/2008 | Junkin | A63F 13/79 463/42 |
| 2008/0153589 A1* | 6/2008 | Baray | A63F 13/52 463/30 |
| 2011/0256915 A1* | 10/2011 | Sloan | A63F 13/828 463/43 |
| 2012/0231890 A1* | 9/2012 | Junkin | A63F 13/795 463/42 |
| 2013/0303291 A1* | 11/2013 | Hughes | A63F 13/12 463/42 |
| 2014/0066188 A1* | 3/2014 | Brooks | G07F 17/3225 463/28 |
| 2014/0329594 A1* | 11/2014 | Kim | A63F 13/5372 463/31 |
| 2014/0349750 A1* | 11/2014 | Thompson | H04N 21/812 463/31 |
| 2015/0375117 A1* | 12/2015 | Thompson | A63F 13/79 463/9 |
| 2016/0008723 A1* | 1/2016 | Thompson | H04N 21/812 463/31 |
| 2016/0041661 A1* | 2/2016 | Bertel | A63F 13/46 463/31 |
| 2016/0375365 A1* | 12/2016 | Thompson | A63F 13/46 463/9 |
| 2017/0087474 A1* | 3/2017 | Moh | A63F 13/46 |
| 2018/0126269 A1* | 5/2018 | Lourenco | A63F 13/65 |
| 2018/0161680 A1* | 6/2018 | Thompson | H04N 21/23424 |
| 2019/0311575 A1* | 10/2019 | Green | G06T 11/60 |
| 2020/0061465 A1* | 2/2020 | Benedetto | A63F 13/46 |
| 2020/0114260 A1* | 4/2020 | Lourenco | A63B 71/06 |
| 2020/0289928 A1* | 9/2020 | Moskowitz | A63F 13/52 |
| 2020/0293271 A1* | 9/2020 | Moskowitz | H04N 21/6582 |
| 2020/0294365 A1* | 9/2020 | Moskowitz | G07F 17/3223 |
| 2021/0154577 A1* | 5/2021 | Lourenco | A63F 13/335 |
| 2022/0054936 A1* | 2/2022 | Salik | A63F 13/63 |
| 2022/0092937 A1* | 3/2022 | Huke | G07F 17/3288 |
| 2022/0139149 A1* | 5/2022 | Huke | G07F 17/3288 463/25 |
| 2022/0245989 A1* | 8/2022 | Huke | G07F 17/323 |

* cited by examiner

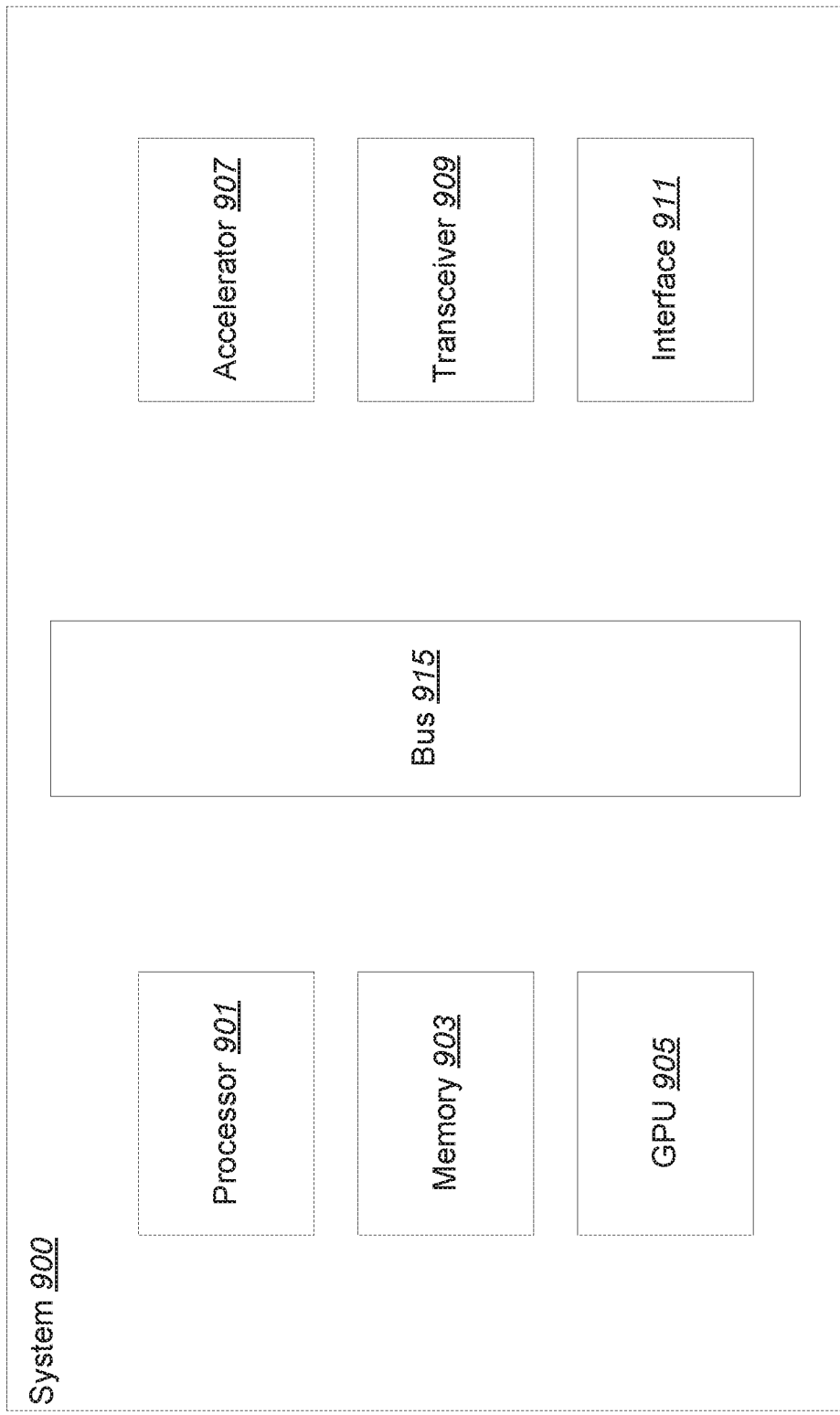

SYSTEMS AND METHODS FOR MANIPULATION OF OUTCOMES FOR VIRTUAL SPORTING EVENTS

CROSS-REFERENCE TO RELATED APPLICATIONS

This application claims priority under 35 U.S.C. § 119(e) to U.S. Provisional Application No. 62/817,410, filed Mar. 12, 2019, entitled SYSTEMS AND METHODS FOR MANIPULATION OF OUTCOMES FOR VIRTUAL SPORTING EVENTS, the contents of which are hereby incorporated by reference.

TECHNICAL FIELD

The present disclosure relates to a system and associated methods of audio and video content processing. In one example, the present disclosure relates to generation of virtual sporting events.

BACKGROUND

Virtual sporting events have been rapidly gaining popularity among several industries. Fantasy sports is a type of entertainment involving imaginary or virtual teams assembled from real players of a professional sport, which compete based on the statistical performance of those players in actual games. This performance is converted into points that are compiled and totaled according to selected rosters, which may be compiled and calculated using computers tracking actual results of the professional sport. Esports (also known as electronic sports, e-sports, or eSports) is a form of competition using video games, most commonly taking the form of organized, multiplayer video game competitions, particularly between professional players and teams. Such multiplayer video games often involve competitions of professional sports, such as basketball, soccer, and baseball, featuring fictional players and real players from the corresponding professional sport.

Revenue may be generated from broadcasting, advertising, wage placement, and other fees for managing leagues, scoring, and user accounts. As such, it is desirable to provide new forms of virtual sporting events based on actual and fictional sports and athletes.

SUMMARY

Provided are various mechanisms and processes for generating virtual sporting events. A set of valid event segments are identified for a given time segment of a virtual sporting event. An outcome category is determined for each of the valid event segments, which indicates an outcome of a play corresponding to the valid event segment. Audience input is obtained over a network from a plurality of client devices associated with a plurality of audience members. The audience input indicates a desired outcome for the given time segment. A valid event segment is then selected as a virtual event segment for the given time segment based on at least the desired outcome. Selection of the virtual event segment may comprise biasing the set of valid event segments to obtain a predetermined proportion of valid event segments with outcome categories corresponding to the desired outcome.

In one aspect, which may include at least a portion of the subject matter of any of the preceding and/or following examples and aspects, a method for manipulating outcomes of virtual sporting events comprises identifying one or more event segments as a set of valid event segments for a given time segment of a virtual sporting event. The method further comprises determining an outcome category for each valid event segment of the set of valid event segments. The outcome category for each valid event segment indicates an outcome of a play corresponding to the valid event segment. The method further comprises obtaining audience input, over a network, from a plurality of client devices associated with a plurality of audience members, wherein the audience input indicates a desired outcome for the given time segment. The method further comprises selecting a valid event segment as a virtual event segment for the given time segment based on at least the desired outcome and the outcome category for each valid event segment.

Selecting a valid event segment as a virtual event segment may comprise biasing the set of valid event segments to obtain a biased set of valid event segments, which comprise a predetermined proportion of valid event segments with outcome categories corresponding to the desired outcome, and selecting the virtual event segment from the biased set of valid event segments.

Each event segment of the one or more event segments may comprise portions of reference content data. The reference content data may comprise reference video, reference audio, and reference statistics of a plurality of original sporting events. Each event segment of the one or more event segments may comprise corresponding video data segments from the reference video, audio data segments from the reference audio, and statistical play data from the reference statistics. Each event segment of the one or more event segments may be classified with one or more categories based on the portion of reference content data corresponding to the event segments, wherein the one or more categories includes the outcome category.

The method may further comprise retrieving an event segment as a virtual event segment for each time segment of the virtual sporting event including retrieving the biased virtual event segment for the given time segment. The method may further comprise desensitizing each of the virtual event segments by at least partially removing color and sound from each of the virtual event segments. The method may further comprise mapping virtual event data to each of the virtual event segments. The virtual event data may comprise one or more selected from the group consisting of: virtual event audio and fictional character information. The method may further comprise generating virtual event information for the virtual sporting event based on the mapped virtual event data and a progress of the virtual sporting event indicated by the virtual event segments.

In certain aspects, identifying the one or more event segments as the set of valid event segments may comprise receiving historical play data corresponding one or more historical sporting events, and determining probabilities of occurrence for different play types at different progress points based on the historical play data. Then for the given time segment, a current progress point may be determined based on virtual event information for virtual event segments selected for one or more previous time segments. Then for the given time segment, the one or more valid event segments may then be identified based on the probabilities of occurrence such that the set of valid event segments includes a proportion of valid event segments with play types corresponding to the probabilities of occurrence for different play types.

In certain aspects, identifying the one or more event segments as the set of valid event segments may comprise receiving a programmed objective, wherein the programmed objective includes one or more predetermined conditions, and determining current virtual event information based on virtual event segments selected for previous time segments. Then for the given time segment, it is determined if the predetermined condition is satisfied based on the current virtual event information. If the predetermined condition is satisfied, the one or more valid event segments are identified based the programmed objective such that each valid event segment includes a category that satisfies the programmed objective.

The method may further comprise displaying the desensitized virtual event segments in conjunction with associated virtual event data and virtual event information, obtaining narrative audio corresponding to the desensitized virtual event segments and corresponding virtual event data, creating a virtual event audio file including non-interactive audio including the narrative audio and corresponding virtual event audio, and transmitting the virtual event audio file, via the network, to the plurality of client devices associated with the plurality of audience members.

In certain aspects, identifying the one or more event segments as the set of valid event segments comprises, for the given time segment, obtaining audience feedback data from the plurality of client devices associated with the plurality of audience members, wherein the audience feedback data indicates a desired category, and identifying one or more valid event segments that include a category corresponding to the desired category.

In another aspect, a method for manipulating outcomes of virtual sporting events comprises generating a set of complete virtual sporting events, each complete sporting event comprising a possible combination of event segments, each event segment corresponding to a time segment of the respective complete virtual sporting event. The method further comprises determining an outcome of each complete virtual sporting event in the set of complete virtual sporting events, and obtaining audience input, over a network, from a plurality of client devices associated with a plurality of audience members, wherein the audience input indicates a desired outcome. The method further comprises selecting a complete virtual sporting event as a chosen virtual sporting event based on at least the desired outcome and the outcome of each complete virtual sporting event.

Selecting a complete virtual sporting event the chosen virtual sporting event may comprise biasing the set of complete virtual sporting events to obtain a biased set of complete virtual sporting events. The biased set may comprise a predetermined proportion of complete virtual sporting events with outcomes corresponding to the desired outcome. The chosen virtual sporting event may then be selected from the biased set of complete virtual sporting events.

The method may further comprise retrieving the event segments corresponding to the chosen virtual sporting event as virtual event segments, and desensitizing each of the virtual event segments by at least partially removing color and sound from each of the virtual event segments. The method may further comprise mapping virtual event data to each of the virtual event segments. The virtual event data comprises one or more selected from the group consisting of: virtual event audio and fictional character information. The method may further comprise generating virtual event information for the chosen virtual sporting event based on the mapped virtual event data and a progress of the chosen virtual sporting event indicated by the virtual event segments.

Other implementations of this disclosure include corresponding devices, systems, and computer programs, and associated methods for generating a virtual sporting event. These other implementations may each optionally include one or more of the following features. For instance, a non-transitory computer readable medium stores one or more programs configured for execution by a computer. The one or more programs comprise instructions for implementing the described method. Also provided is a system comprising one or more processors, memory, and one or more programs comprising instructions for implementing the described method.

These and other examples are described further below with reference to the figures.

BRIEF DESCRIPTION OF THE DRAWINGS

FIG. 9 illustrates a particular example of a computer system that can be used with various embodiments of the present disclosure.

DETAILED DESCRIPTION

Figure 1:
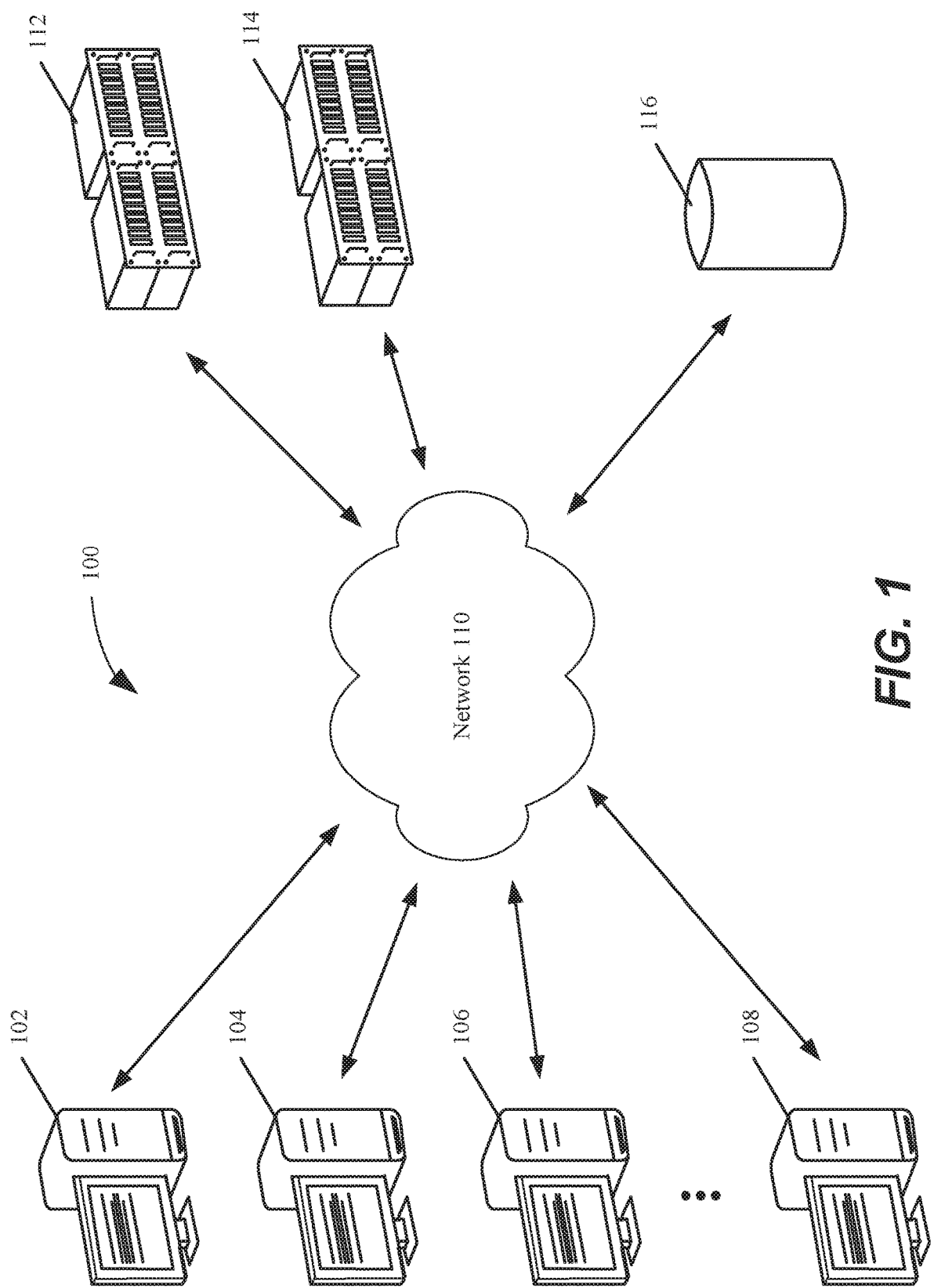
FIG. 1 is an example network architecture for implementing various systems and methods of the present disclosure, in accordance with one or more embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting. On the contrary, it is intended to cover alternatives, modifications, and equivalents as may be included within the spirit and scope of the present disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

For example, the techniques of the present invention may be described in the context of various sporting events, such as football games, baseball games, basketball games, etc. However, it should be noted that the techniques of the present invention may also be applied to audio or video content for various other types of virtual events, such as fictional stories or literary events, computer gaming or electronic sports, etc. The techniques of the present invention may be described in the context of particular protocols, such as Wi-Fi or Bluetooth. However, it should be noted that the techniques of the present invention may also be applied to variations of protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

The systems and methods described herein can be implemented to manipulate outcomes of virtual sporting events. Reference content data corresponding to original sporting events may be segmented into a plurality of event segments based on predetermined milestones. Each event segment may be classified with one or more outcome categories. A virtual sporting event may comprise one or more consecutive time segments. One or more event segments are selected as a virtual event segment for each time segment based on a combination of various segment selection methods. In some embodiments, event segments may be selected at random.

However, in some embodiments, a virtual coach or virtual team method may select event segments based on estimated probabilities of occurrence of different plays based on historical event data corresponding to particular teams or coaches. In some embodiments, a principled play selection method may select event segments based on various programmed objectives. In some embodiments, an interactive play selection method may select event segments based on user input received from various client devices.

In some embodiments, game manipulation techniques may be implemented on the virtual sporting event. Various audience input may be received to influence various outcomes by influencing the probabilities of which event segments are selected as virtual event segments for various time segments. As such, the outcome of an original sporting event may be biased by audience interaction.

The abovementioned methods may identify a set of valid event segments for a given time segment. The set of valid event segments may then be biased toward a particular outcome based on user input received from listeners. Such input may be various forms of audience participation, including audio input (cheers, jeers, yelling), wagers, listener location, listener profile information, etc. For example, if a majority of listeners indicate that they support a particular team, then the user input may indicate that a successful play for the particular team is the desired outcome for the given time segment.

The set of valid event segments may be biased to include a particular proportion of valid event segments with outcome categories that correspond to the desired outcome. For example, the set of valid event segments may be biased to include only valid event segments corresponding to the desired outcome. As another example, the set may be refined to include 80% of event segments corresponding to the desired outcome. A valid event segment is then be selected from the biased set as a virtual event segment for the given time segment.

Example Embodiments

With reference to FIG. 1, shown is an example network architecture 100 for implementing various systems and methods of the present disclosure, in accordance with one or more embodiments. The network architecture 100 includes a number of client devices 102-108 communicably connected to one or more server systems 112 and 114 by a network 110.

In some embodiments, server systems 112 and 114 include one or more processors and memory. The processors of server systems 112 and 114 execute computer instructions (e.g., network computer program code) stored in the memory to perform functions of a network data exchange server. In various embodiments, the functions of the network data exchange server may include generating virtual sporting events with corresponding audio and video content and/or transmitting the corresponding audio and video content to one or more client devices.

In some embodiments, server system 112 is a content server configured to receive, process, and store content and information. In some embodiments server system 114 is a dispatch server configured to transmit and/or route network data packets including network messages. In some embodiments, content server 112 and dispatch server 114 are configured as a single server system that is configured to perform the operations of both servers. In some embodiments, various functions of server systems 112 and 114 may be divided among additional other server or sub-server systems.

In some embodiments, the network architecture 100 may further include a database 116 communicably connected to client devices 102-108 and server systems 112 and 114 via network 110. In some embodiments, network data, or other information such as user information, user input, and device information may be stored in and/or retrieved from database 116. In some embodiments, the server systems described herein may include databases, such as database 116, as integrated components to function as memory for storage.

Users of the client devices 102-108 access the server system 112 to participate in a network data exchange service. For example, the client devices 102-108 can execute web browser applications that can be used to access the network data exchange service. In another example, the client devices 102-108 can execute software applications that are specific to the network (e.g., networking data exchange "apps" running on smartphones).

Users interacting with the client devices 102-108 can participate in the network data exchange service provided by the server system 112 by distributing digital content, such as text comments (e.g., updates, announcements, replies), audio files, digital photos, videos, online orders, payment information, activity updates, location information, or other appropriate electronic information. In some implementations, information can be posted on a user's behalf by systems and/or services external to the network or the server system 112. For example, the user may transmit audio or video content to a program broadcasting website, and with proper permissions that website may cross-post the audio or video content to the network on the user's behalf. In another example, a software application executed on a mobile device, with proper permissions, may use global positioning system (GPS) capabilities to determine the user's location and automatically update the network with his location (e.g., "At Home", "At Work", "In San Francisco, Calif.").

In some implementations, the client devices 102-108 can be computing devices such as laptop or desktop computers, smartphones, personal digital assistants, portable media players, tablet computers, or other appropriate computing devices that can be used to communicate with an electronic social network. In some implementations, the server system 112 can include one or more computing devices such as a computer server. In various embodiments, a client device may correspond to a user such as an administer or developer that uses the client device for generation of a virtual sporting event.

In some implementations, the server system 112 can represent more than one computing device working together to perform the actions of a server computer (e.g., cloud computing). In some implementations, the network 110 can be a public communication network (e.g., the Internet, cellular data network, dial up modems over a telephone network) or a private communications network (e.g., private LAN, leased lines).

Virtual Event Systems

Figure 2:
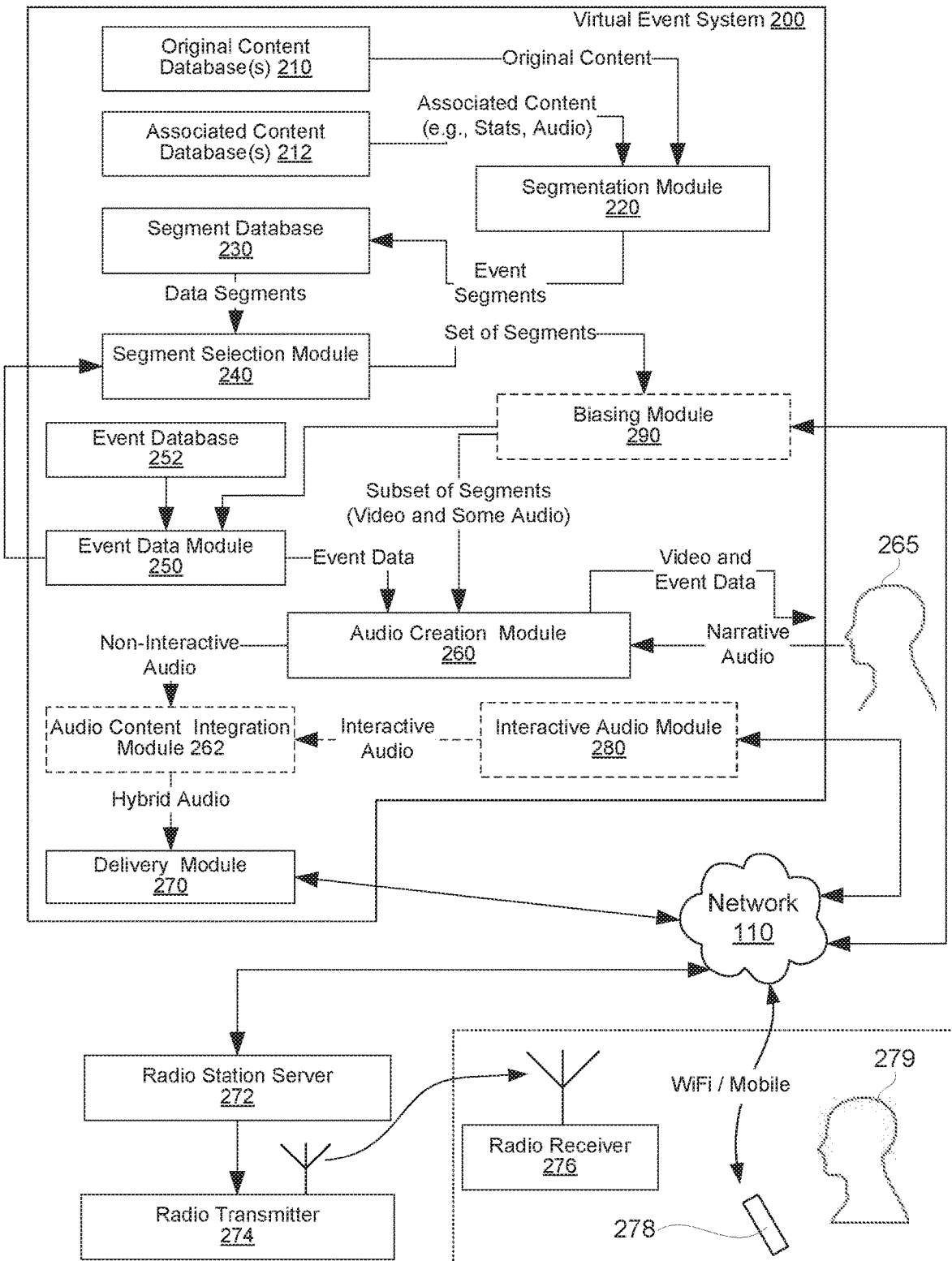
FIG. 2 is an example virtual event system for generating virtual sporting events, in accordance with one or more embodiments.

With reference to FIG. 2, shown is an example virtual event system 200 for generating virtual sporting events, in accordance with one or more embodiments. In various embodiments, virtual event system 200 may be a combination of one or more of server systems 112 and 114, and database 116, described within system architecture 100. In various embodiments, virtual event system 200 comprises original content database 210, associated content database 212, segmentation module 220, segment database 230, segment selection module 240, event data module 250, event database 252, audio creation module 260, audio content integration module 262, delivery module 270, and interactive audio module 280.

Each module within virtual event system 200 may be implemented as a separate server system or configured as a single server system in virtual event system 200 that is configured to perform the operations of all modules. Similarly, each database within virtual event system 200 may be implemented as a separate database or configured as a single database system that is configured to perform the operations of all databases. One or more methods described herein may be discussed with reference to FIG. 2.

In various embodiments, original content database 210 stores original content including audio and video content data associated with one or more original events, such as original sporting events (American football, soccer, baseball, basketball, hockey, tennis, golf, etc.). The original content data may be content associated with live or recorded coverage of an original sporting event that is broadcast over television, radio, or other broadcasting media, such as the internet.

The original content may correspond with associated content provided or stored in associated content database 212 based on various time positions or other chronological measurements or markers. For example, the original content data may comprise a true time corresponding to the actual real world time the original content was recorded or broadcast. The original content may also comprise a run time corresponding to the length of the video or audio of the original content data file. The original content may additionally, or alternatively, comprise a clock time corresponding to an in-game clock or timer for the recorded event. The associated content may also be associated with a corresponding actual time, clock time, or run time. Some examples of the associated content are various other footage of the sporting event, sounds from the field, player sounds, crowd or spectator sounds, sounds from game officials or referees, commentary from a sports announcer or sportscaster, etc. In some examples, the associated content is created based on original content that has been extracted or separately recorded. Associated content may further include statistical play data corresponding to the original sporting event. For example, each play or down of a football game stored in original content database 210 may include statistical data for each player involved in such play, including player information, running yards, passing yards, total yards gained or lost, play type, tackles, down information, etc. In some embodiments, these statistics may also be derived from audio and video of the original content.

In some embodiments, associated content database 212 is separate from original content database 210. However, in some embodiments, original content database 210 and associated content database 212 are configured as a single database system that is configured to perform the operations of both databases. The original content and the associated content may be stored in any one of various types of video file formats, such as Audio Video Interleave (AVI), Flash Video Format (FLV), Windows Media Video (WMV), Apple QuickTime Movie (MOV), and Moving Pictures Expert Group 4 (MP4). However, it should be recognized that the original and associated content may comprise various other file formats.

Segmentation of Original Content Data

In various embodiments, segmentation module 220 is configured to separate the original content and associated content, into event segments based on predetermined milestones (e.g., down in a football game, at bat in a baseball game, clock time in a basketball game, each pitch thrown in a baseball game). Various techniques may be implemented to identify the predetermined milestones, such as optical character recognition (OCR) of information shown within the video of the original content, statistical play data, motion detection, audio recognition of various audio and sounds in the original content. For example, segmentation module 220 may be configured to detect the clock time, closed caption text, changes in downs or yardage, as well as penalties and scores graphically displayed in the video using OCR techniques and mark the particular time position of the original content for segmentation. As another example, segmentation module 220 is configured to recognize various audio and sounds in the original content, such as by identifying a whistle sound from a referee, which may signal the end of each down, penalty, or other event, in a football game. Thus, segmentation module 220 may be configured to detect particular sounds and audio, and mark the original content for segmentation at each time position a whistle sound is detected.

In some embodiments, milestones may be determined based on statistical play data. For example, statistical play data may record the time position (actual time, run time, or clock time) of each down in a football game. In some embodiments, motion detection may be implemented to identify the predetermined milestones of a sporting event. For example, the start or end of each down in the football game may be identified based on the motion of players on the field in the video.

Figure 3:
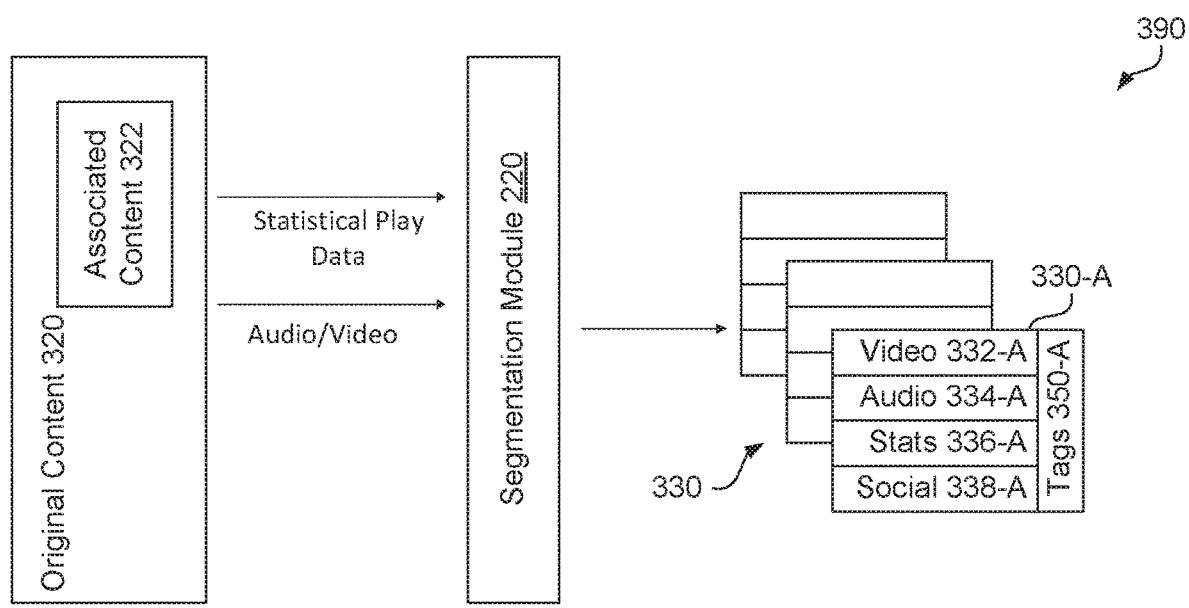
FIG. 3 illustrates a process flow for segmentation of original content by segmentation module, in accordance with one or more embodiments.

The original content is separated into event segments based on the predetermined milestones. With reference to FIG. 3, shown is a flow process 390 for segmentation of original content 320 by segmentation module 220, in accordance with one or more embodiments. As an example, original content 320 may be a recording of a televised football game and comprise audio data and video data. As previously described, original content 320 may include associated content 322 comprising supplemental audio and video data, as well as statistical play data.

In various embodiments, segmentation module 220 separates original content 320 into one or more event segments 330 by marking the beginning and end of each event segment 330 in the original content based on the milestones identified at operation 304. The time position in the original content at which each identified milestone occurs may be recorded as a mark-in point corresponding to the beginning of an event segment. Additionally, or alternatively, the time position at which a milestone occurs may be recorded as a mark-out point corresponding to the end of an event segment. In various embodiments, the mark-in point or the mark-out point may correspond to the particular actual time, clock time, or run time of the original content. As such, segmentation information, including the mark-in point and/or mark-out point of each event segment, is stored in segment database 230. In some embodiments, segment database 230 may be a table level distributed database system. In some embodiments, the mark-in point and/or mark-out point of each event segment is stored as metadata associated with the original content data. Thus, each of the event segments 330 may comprise a segmented video component and a segmented audio component defined by a mark-in point and/or mark-out point. As illustrated, exemplary event segment 330-A of event segments 330 comprises video segment 332-A and audio segment 334-A.

Other associated content corresponding to the original content may also be segmented at segmentation module 220. In some embodiments, segment database 230 may further store segmentation information corresponding to this associated content. In certain embodiments, statistical play data may also be marked and associated with corresponding event segments 330 based on timestamps for each recorded statistic. In some embodiments, social media data may also be marked and associated with corresponding event segments 330. In some embodiments, social media data may be received from various sources, servers, or databases and stored as associated content in associated content database 212. This social media data may be received by the segmentation module and correlated with the timing of the broadcast of the original sporting event of the original content. The timestamp for a statistic or social media post may then be synched to the original content based on actual time, clock time in the original sporting event, or a particular run time position of the original content data file. As such, the particular statistical play data or social media data may be associated with a particular event segment in the segment database, such as statistical play data 336-A of event segment 330-A or social media data 338-A of event segment 330-A, respectively.

In various embodiments, original content data and associated content data may be processed multiple times by different techniques to refine the identification of the mark-in or mark-out points of the event segments. In the example of a football game, OCR techniques may be first used to identify the number of the down for each play indicated by a graphical information panel in the original content. Next, motion detection techniques may then be used to further pinpoint when each play starts or ends. Although OCR techniques may be accurate in reading the text of the graphical information panel, the indication of the down number may not accurately correspond with the exact start and end of the play corresponding to the indicated down. However, OCR identification may utilize relatively less processing power than other segment identification techniques, and may be first used to process the entire length of the original content of a game to identify the approximate mark-in point of each event segment in the original content. In some embodiments, motion detection techniques may require relatively more processing power, but may be more accurate in determining the start of a play. As such, the motion detection may be implemented only on portions of the original content, such as during the 5 seconds before and 5 seconds after the mark-in point corresponding to each change in down number previously determined by OCR. The segmentation module may then adjust or update the mark-in or mark-out points of the event segments accordingly in the segmentation database. Thus, event segments may be more accurately identified using less overall processing power and time. It should be recognized that various video and audio processing techniques may be more suited to identify event segments for different sporting events.

Classifying Event Segments

In various embodiments, event segments may be classified into one or more categories based on identified characteristics in the event segments. Various characteristics of each event segment be identified and associated with the event segment. In various embodiments, the characteristics are identified based on the audio data, video data, and/or associated content associated with the event segment. The identified characteristics may be stored as segmentation information in the segment database. The various characteristics may be based on statistics extrapolated from statistical play data corresponding to the event segment. Statistical play data may indicate various statistical play characteristics including play type, yardage gained or lost, resulting penalties, position of players, etc.

The various characteristics may also include audio characteristics and video characteristics. Audio characteristics determined from audio data in the audio segment may include sounds related to players, officials, the crowd or spectators, or other sounds from the game, as well as the volume of the sounds. The various video characteristics may be determined based on video and image data from the video segment. Video characteristics may include camera speed, player movement speed, play type, etc.

In various embodiments, the audio and video processing techniques previously described may also be implemented to identify the characteristics of the event segments. OCR techniques may be used to analyze closed captioning text or other onscreen text to determine whether the event segment involves a penalty, score, or turnover. Neural networks and machine learning techniques may also be implemented to recognize play types, such as passes or runs in a football game. Segmentation module 220 may also include a neural network or machine learning techniques trained to recognize types of crowd sounds, such as cheering or booing.

Other characteristics may include viewer characteristics based on the social media data that has been associated with a particular event segment. Viewer characteristics may include types and amount of feedback from viewers of the original sporting event other than the crowd or spectators present at the original sporting event. As used herein, people present at the original sporting event may be referred to as "spectators" or "crowd", while the term "viewer" refers to a person watching or listening to the original sporting event that are not spectators or crowd members, such as over television or internet broadcast for example. As used herein, the term "audience" refers to a people viewing or listening to a virtual sporting event generated by the described systems and methods. Viewer characteristics may be determined based on the social media data associated with the event segment. OCR techniques and word recognition may also be implemented to determine and characterize whether the social media posts were positive or negative toward the corresponding play or event. Artificial neural networks and other machine learning methods may be implemented for such natural language text reasoning.

Once characteristics are identified, the event segments may be classified with categories based on the identified characteristics. Various categories may be used to classify the event segments, and event segments may be classified into multiple categories. In some embodiments, an event segment may be classified by associating one or more tags with the event segment, where each tag corresponds to a category, such as tags 350-A of exemplary event segment 330-A. Such classifications may then be stored in the segment database. In some embodiments, the classifications are stored in metadata of the original content data or associated content data.

In various embodiments, categories may include statistical play categories based on statistical play characteristics, such as players involved, length of the play, timing of the play in the game (time position), type of play, result of the play, position on the field, etc. For example, statistical play categories for event segments of a football game may include run plays, pass plays, special plays, punts, etc. Event segments categorized as pass plays may further be classified into categories of plays involving the running back, the tight end, turnover passes, etc.

Outcome categories may also be determined from statistical play data to indicate the success or failure of a play corresponding to the event segment. For example, event segments categorized as pass plays may further be classified based on position of players involved, or result such as incomplete passes and complete passes. As another example, event segments categorized a run plays may further be classified into positive or negative yardage categories. The categories may also indicate the degree of success or failure. For example, event segments classified may further be classified by amount of yardage gained or lost. Categories pertaining to yardage gained or lost may be based on ranges of yards gained or lost. In some embodiments, the range of yardage may vary based on frequency of such events. For example, plays gaining between 0-15 yards may be divided into separate categories corresponding to each number of yards gained because they occur more often. Plays gaining between 15-19 yards may be grouped into one single category, and plays gaining more yardage may be grouped into a category with a larger range, such as 20-29 yards gained, 30-49 yards gained, and 50+ yards gained, as plays resulting in such yardage occur with less frequency.

In general, categories based on statistical characteristics may correspond to objective qualities of an event segment. However, statistical characteristics may also be used to determine subjective qualities, such as play difficulty. Other categories based on identified audio and video characteristics may correspond to subjective qualities, but may be classified using objective measures, as described above. The other categories may include play intensity, play difficulty, or play speed. For example, event segments may be categorized by high, medium, and low play intensity; high, medium, and low play difficulty; and fast and slow play speed. Event segments may be placed into such categories based on audio or video characteristics as described above. Categories for play intensity, play difficulty, and play speed of an event segment may be classified based on video data from the corresponding video segment and/or audio data from the corresponding audio segment.

Other categories may include crowd sentiment. For example, event segments may be categorized as positive, negative, or neutral crowd sentiment, as well as high, medium, or low sentiment. The crowd sentiment of an event segment may be classified based on audio characteristics of crowd sounds, including types of crowd sounds and volume of the crowd sounds. Event segments may also be categorized by crowd sentiment based on the characteristics of corresponding social media data.

Virtual Event Creation

Figure 4:
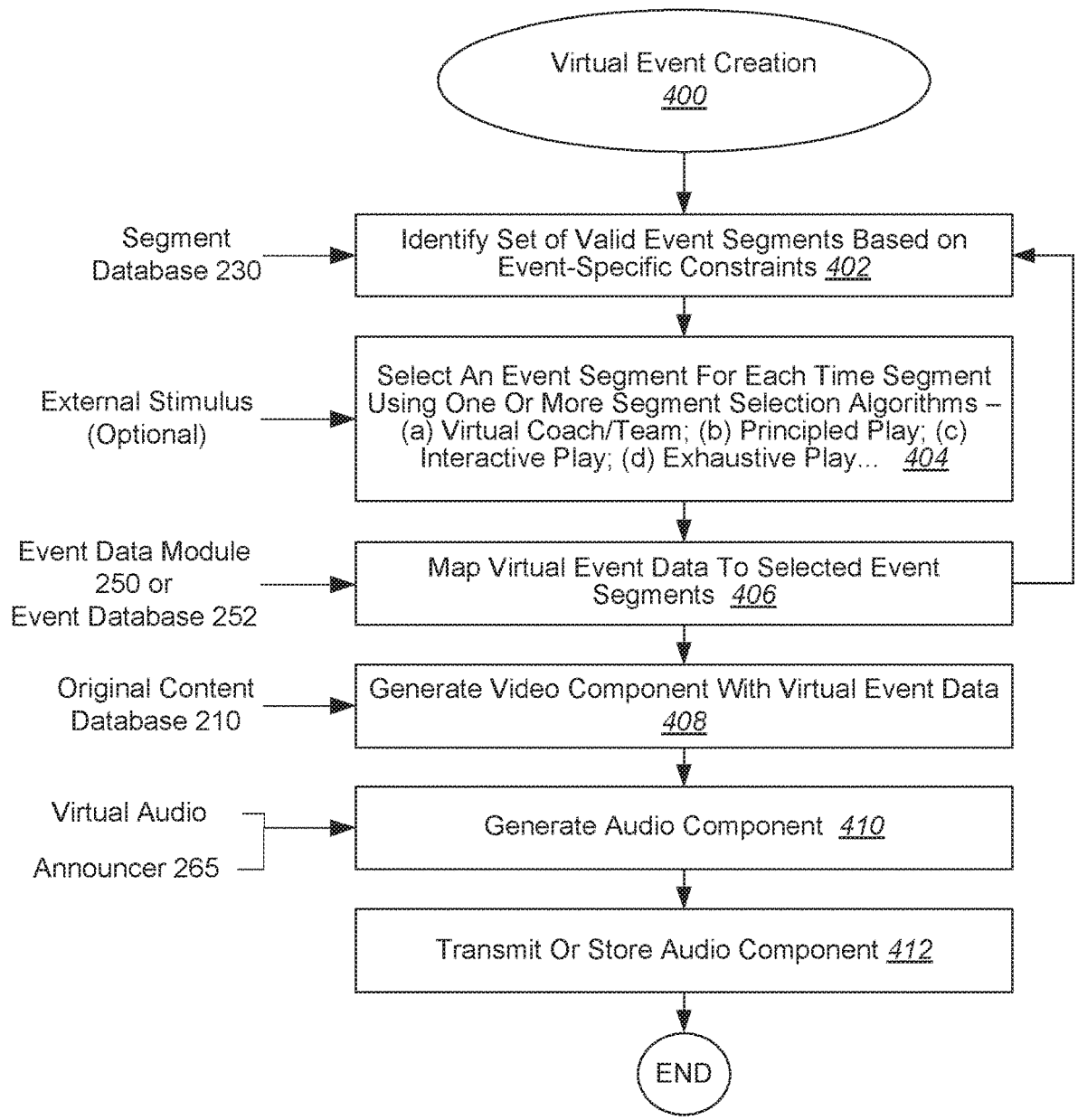
FIG. 4 is an example method for virtual event creation, in accordance with one or more embodiments.

The stored and classified event segments may then be concatenated together in various orders to form a complete virtual sporting event, as will be further described. Segment selection module 240 may be configured to select one or more event segments for each time segment of the virtual sporting event. In some embodiments, the virtual sporting event is comprised of one or more consecutive time segments. Each time segment may vary in length of time, and may comprise one or more event segments. In some embodiments, the length of each time segment may be equal to the length of the one or more event segments selected for such time segment. With reference to FIG. 4, shown is an example method 400 for virtual event creation, in accordance with one or more embodiments. Method 400 may be implemented by a server of virtual event system, such as segment selection module 240 and/or audio creation module 260.

At operation 402, a set of valid event segments for a particular time segment of the virtual event is identified based on event-specific constraints. In some embodiments, an event segment may be selected for a particular time segment subject to certain constraints based on the event segment selected for a previous time segment. The constraints may be determined by virtual game statistics or virtual statistical play data derived from virtual event data mapped to one or more previous time segments, as further described below. Such constraints may correspond to the progression of the game, such as field position of the ball in a football game or the number of outs in an inning in a baseball game. For example, in a virtual football game, if the event segment for a time segment indicates that the ball is at the forty-five yard line, then the event segment selected for the subsequent time segment may be required to start with the ball at, or near, the forty-five yard line. However, selection of event segments for other types of sporting events may not be subject to such constraints.

Other constraints may be based on remaining clock time in the virtual sporting event. For example, if the virtual event is nearing a designated stopping point, such as the half time of a basketball game, the valid event segments may include event segments with a length of time under a predetermined value. Other constraints may require the event segment to include a particular amount of crowd sentiment or excitement so that there is minimized change in crowd sentiment levels between event segments of adjacent time positions. In some embodiments, the constraints may be determined by various segment selection algorithms further described herein.

Multiple valid event segments may be identified that meet the constraints for the particular time position of the virtual event. One or more valid event segments may then be selected for the time segment based on a combination of one or more different segment selection algorithms at operation 404. For example, a valid event segment may be randomly selected for the time position. However, other segment selection algorithms may be implemented. Described herein with reference to FIGS. 6A-6D are various segment selection algorithms and methods including a Virtual Coach algorithm, a Virtual Team algorithm, a Principled Play algorithm, an Interactive Play algorithm, and an Exhaustive Play algorithm. One or more of the segment selection algorithms may utilize machine learning techniques or neural networks to determine probabilities of occurrence for various types of plays at various field positions and other progress points of a sporting event.

In some embodiments, biasing module 290 may be implemented to manipulate the outcome of one or more plays, or of the virtual sporting event, based on external stimulus received from one or more client devices corresponding to audience members of the virtual sporting event. Although biasing module 290 is depicted as a separate module from segment selection module 240, in particular embodiments, biasing module 290 and segment selection module 240 may be configured as a single module that is configured to perform the operations of both databases. Such external stimulus may comprise various information received from client devices including audience participation data or audience feedback data. Such external stimulus may indicate a preferred outcome corresponding to the success of a play in an event segment. In some embodiments, the preferred outcome may correspond to any other occurrence in an event segment, such as the occurrence of a penalty, a particular type of play, etc. As such, the external stimulus may affect the selection of an event segment for a given time segment. This may occur by biasing the available event segments for selection such that event segment corresponding to a particular desired outcome are present at a desired or predetermined proportion or ratio. Methods for manipulating or biasing the selection of event segments or the outcome of a virtual sporting event are further described with reference to FIGS. 7A and 7B.

Once event segments have been selected for each time segment of the virtual sporting event, virtual event data is mapped to the selected event segments at operation 406. Such selected event segments may be transmitted to event data module 250. For example, segmentation information corresponding to the selected event segments may be transmitted to event data module 250, including identification of the selected event segments and identified characteristics and classified categories for the selected event segments. In various embodiments, event data module 250 is configured to map virtual event data to the selected event segments. Virtual event data may be retrieved from event database 252, and may include virtual audio and fictional character information.

Event database 252 may store various virtual audio corresponding to various types of sporting events. Such virtual audio may be artificially created or recorded from other original sporting events. However, in some embodiments, the virtual audio is unrelated to the plays or events included in the event segments to which they are mapped. For example, virtual audio for a football game may include an audible or dialogue between players, contact or hitting sounds, whistles, etc. Event data module 250 may select virtual audio for a particular event segment based on the characteristics determined from the original audio in the original content or associated content.

Event database 252 may also store fictional character information including information about fictional players, coaches, teams, officials. For example, fictional character information may include biographies and historical statistics. In some embodiments, fictional character information may be based in whole, or in part, on existing or actual historical individuals, such as players, coaches, and teams of that sport. For example, two fictional teams may be selected for a virtual football game. The players on the fictional teams may then be mapped to the players included in the event segments selected for the virtual football game based on the respective positions.

In some embodiment event data module 250 may further aggregate the virtual event data to derive virtual game statistics or virtual statistical play data. For example, the cumulative clock time of the virtual sporting event may be calculated. In some embodiments, the event data module 250 may take into account various situations in a sporting event such as timeouts, pauses, or breaks. As another example, scoring plays may be tallied at each time segment to determine the score at any given time position of the virtual sporting event. As another example, penalties may be determined and tracked such that penalty consequences for penalty violations for particular sports may be implemented in the virtual sporting event. For example, if a particular fictional player is ejected based on a penalty violation, that fictional player will be replaced by another fictional player from fictional character information. In some embodiments, such virtual game statistics may be transmitted to segment selection module 240 to affect the selection of event segments at operation 402 or operation 404. For example, if a player in a hockey match is placed in a penalty box, the segment selection module may only select event segments where a particular team plays shorthanded.

In some embodiments, the virtual event data is mapped to corresponding selected event segments at event data module 250, and then transmitted to audio creation module 260 to be displayed with the appropriate selected event segments. At operation 408, a video component of the virtual event is generated from the selected event segments at audio creation module 260. Audio creation module 260 may be configured to integrate the selected event segments and mapped virtual event data into a video component of the virtual sporting event. In various embodiments, the segment selection information may be transmitted to audio creation module 260 which may retrieve the selected segments from the original content stored in original content database 210. As such, the video segments of the identified segment may be transmitted to the audio creation module. Audio creation module 260 may be configured to extract only the identified video segments corresponding to the selected event segments. However, in some embodiments, the audio segments of the identified event segments may also be received at audio creation module 260, such as in file formats where audio and video data are combined. The video data of the selected event segments may be positioned chronologically according to the time sequence of their respective time segments.

In some embodiments, the video component of the virtual sporting event may be desensitized by removing color, sound, and other attributes from the original content data. In various embodiments, the color may be stripped from the video via signal processing techniques. In various embodiments, the audio data may be isolated and removed from the event segment data. Other attributes of the video which may be removed include game information, such as scores, clock times, and other information displayed on graphical information panels in the original content. In some embodiments, the mapped virtual event data may then be incorporated with the desensitized video component of the virtual sporting event, such as by displaying within or overlaying on the video of the time segments. In some embodiments the virtual event data may be displayed on a separate screen, window, or panel as the corresponding event segments are displayed.

At operation 410, a non-interactive audio component of the virtual sporting event is generated at audio creation module 260 based on the video component generated at operation 408. In some embodiments, the non-interactive audio component includes the virtual audio mapped to the selected event segments. As such, the mapped virtual sounds may be played as the corresponding desensitized video component is displayed to a user, such as announcer 265.

Furthermore, the non-interactive audio component also includes narrative audio, which may be created by one or more human commentators, such as announcer 265, viewing the video component. For example, the video component of the virtual sporting event may be displayed at a user interface for viewing by announcer 265 and/or other users. The recorded narrative audio may be combined with various virtual sounds, associated with virtual event 101 (e.g., crowd cheer, helmet hits) to generate non-interactive audio content.

Figure 5:
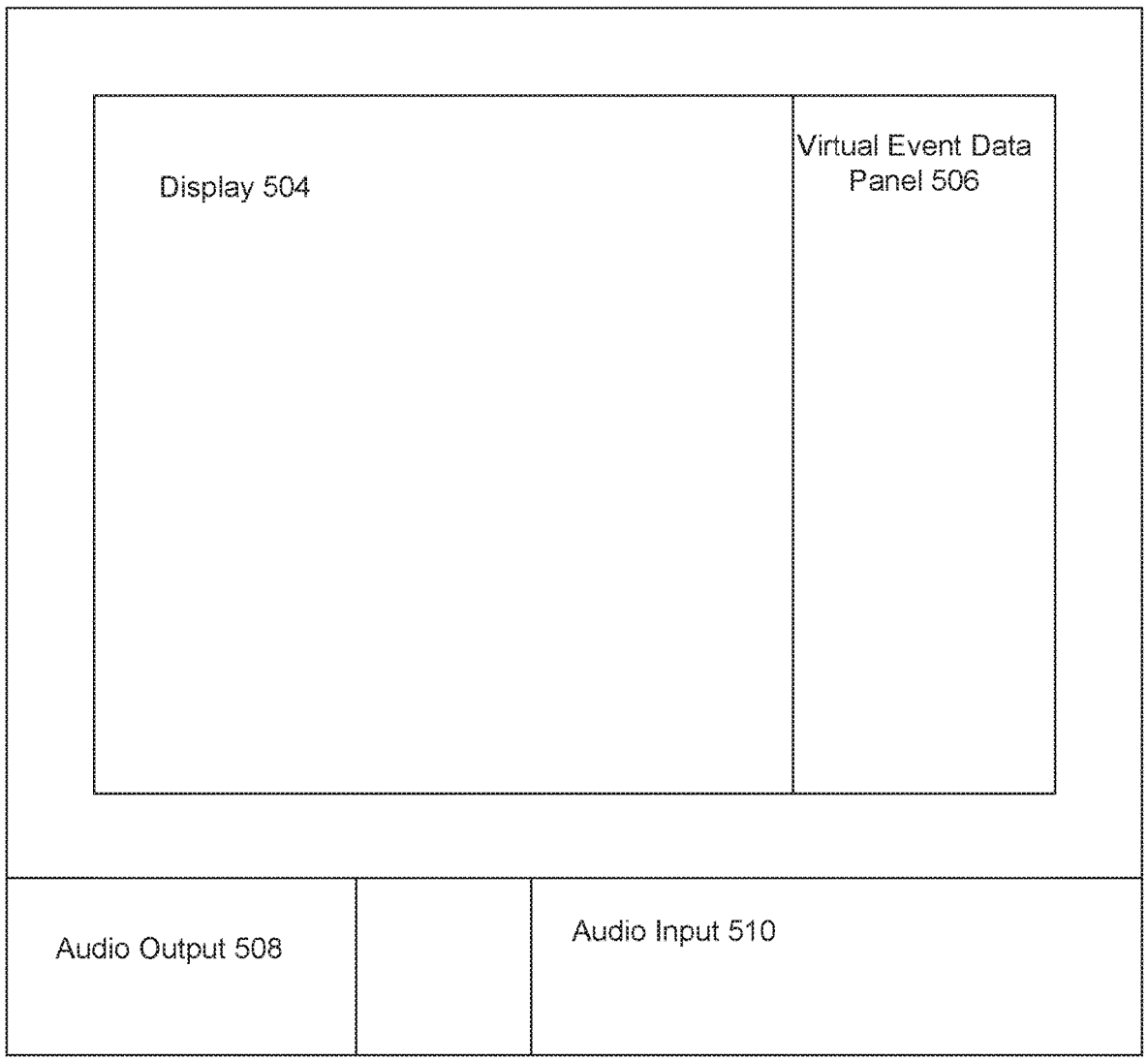
FIG. 5 is an example user interface for displaying a video component of a virtual sporting event, in accordance with one or more embodiments.

With reference to FIG. 5, shown is an example user interface 500 for displaying a virtual sporting event, in accordance with one or more embodiments. In various embodiments, user interface 500 is communicatively coupled to audio creation module 260. In some embodiments, user interface 500 may be an integrated component of audio creation module 260. The video component may be displayed at display 504 along with the virtual event data including the virtual sounds, fictional character information, and accumulated scoring and other virtual game statistics. In some embodiments, the fictional character information and virtual game statistics may be displayed on the user interface at panel 506. In various embodiments, panel 506 may be a graphical information panel or overlay on the video component, or another display separate from display 504. Virtual audio 472 may be presented via audio output device 508. Announcer 265 may then record the narrative audio into an audio input device 510 based on the video component and virtual event data. Narrative audio may comprise commentary, analysis, or other dialogue pertaining to the virtual sporting event and associated event data. As used herein, the non-interactive audio component generated at audio creation module 260 refers to an audio component comprising audio selected and created entirely by virtual event system 200 and excluding audio from external sources, such as client devices.

In some embodiments the narrative audio may also comprise advertisements or other information from sponsors. In some embodiments, advertisements and information from sponsors may be separate audio data that is incorporated into the audio component prior to or during broadcast or transmission of the audio component to client devices corresponding to the audience members. In some embodiments, the commentary may also be automatically generated by a computer system which provides speech and dialogue based on the virtual event data. For example, a computing system may generate a script based on the mapped virtual event data and implement text-to-speech programs to read the script.

Various interactive features may be added to non-interactive audio component to enhance the overall audio experience and, more specifically, to create a more realistic representation of a live event. Interactive audio module 280 may be configured to receive and aggregate user input from the one or more client devices to create an interactive audio component. In some embodiments, users (279) receiving the virtual sporting event audio at client devices (278) may transmit user input to virtual event system 200, including audio input, video input, and various other selections. In some embodiments, interactive audio may be generated from received the audio input including various audio data created by listening users, such as user 279, which may include cheering, jeers, comments, clapping, etc. In some embodiments, audio creation module 280 may generate audio data or retrieve virtual audio from virtual event database 252 based on the user input.

Interactive audio module 280 may be configured to combine the interactive audio with the non-interactive audio for transmission to at least a portion of the audience members as a hybrid audio component over the network by delivery module 270. As such, virtual event system 200 may implement a feedback loop, wherein users listening to the virtual sporting event create interactive audio, which is then transmitted to the users in real-time.

At operation 412, the audio component is transmitted or stored. In some embodiments, the non-interactive audio may be transmitted via delivery module 270. In some embodiments, delivery module 270 may include a database for storing audio components for one or more virtual sporting events. Delivery module 270 may be configured to transmit the audio component (non-interactive or interactive) as an audio file to a network, such as network 110. In various embodiments, network 110 may be a global network such as the Internet. In some embodiments, the audio component is transmitted to client devices, such as client device 278, over Wi-Fi or mobile data. In some embodiments, the audio component is transmitted via radio station server 272 for broadcast via radio transmitter 274. The radio broadcast may then be received by radio receiver 276 and output to user 279. In some embodiments radio receiver 276 may be a component of user device 278.

Methods of Segment Selection

Virtual Coach/Team Selection

As previously described, event segments may be selected by one or more methods, such as at operation 404. Such methods may comprise various segment selection algorithms. With reference to FIGS. 6A-6D, shown are methods for selecting event segments for various time segments of a virtual sporting event, in accordance with one or more embodiments.

Figure 6A:
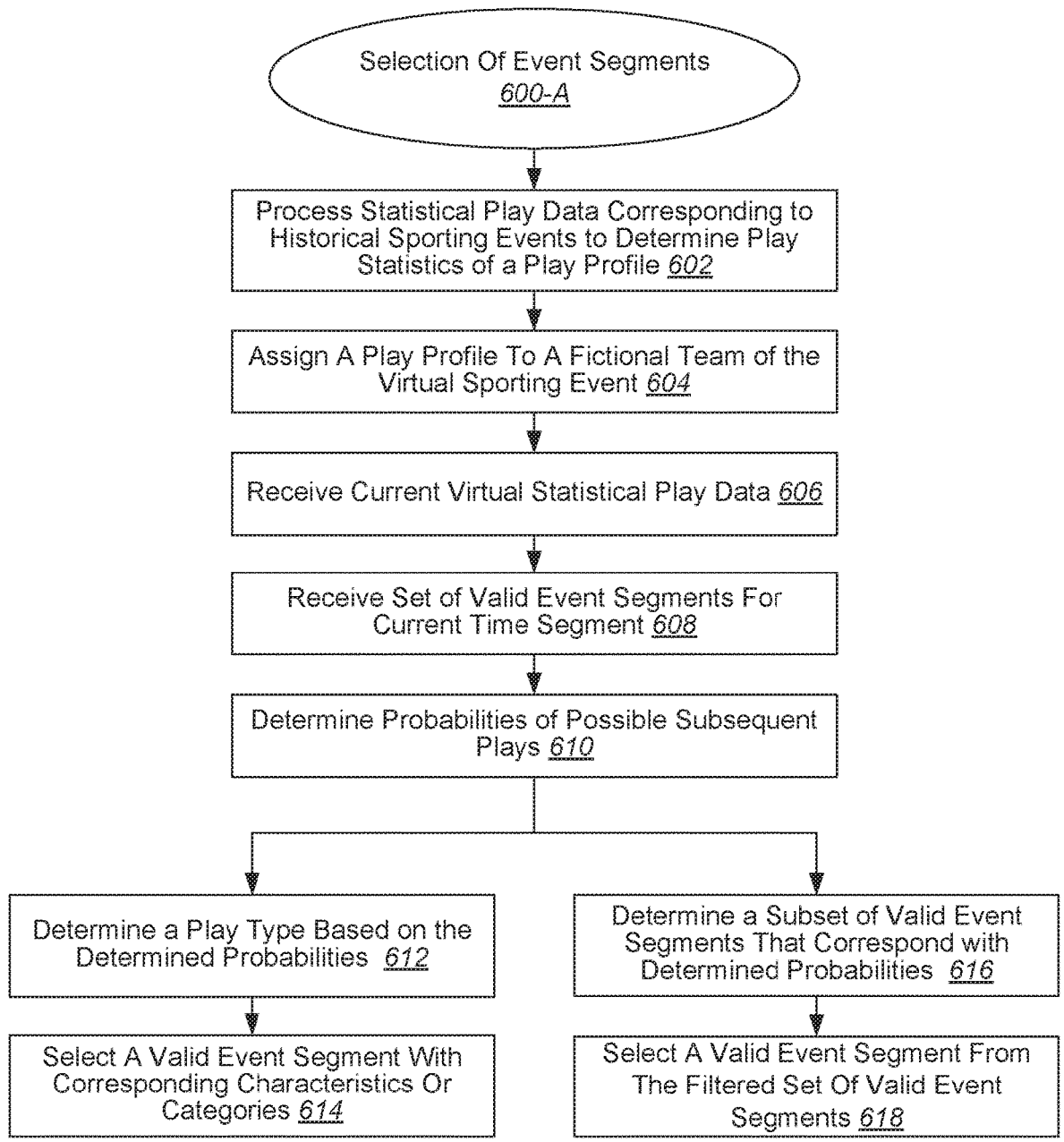
FIG. 6A illustrates an example method for selecting event segments using a Virtual Coach or Virtual Team method, in accordance with one or more embodiments.

A Virtual Coach or Virtual Team method may be implemented to select event segments that include plays with characteristics or classifications based on the predicted decisions of existing teams or coaches and managers of existing teams. With reference to FIG. 6A, shown is an example method 600-A for selecting event segments using a Virtual Coach or Virtual Team method, in accordance with one or more embodiments.

At step 602, statistical play data corresponding to historical sporting events is processed. In some embodiments, the statistical play data may be related to, derived from, or comprised of the statistical play data in the associated content. In some embodiments, statistical play data may be received from third-party vendors. The steps of method 600-A will be described mainly with reference to American football. However, it should be recognized that various other methods of organizing statistical play data may be implemented for different sporting events. In some embodiments, processing the statistical play data may comprise assigning tags to the statistical play data to associate particular data with a grouping. In some embodiments, processing the statistical play data may comprise creating groupings and counting the number of plays that fall within each grouping.

During the processing, the information in the statistical play data may be used to determine decision-making probabilities for each profile. In some embodiments, the statistical play data may be organized by particular play profiles corresponding to particular teams or coaches. For example, statistical play data relating to a team, such as the Oakland Raiders, may be grouped or otherwise associated with an Oakland Raiders play profile. As another example, statistical play data relating to play decisions made by a coach, such as Pete Carroll, may be associated with a Pete Carroll play profile. In some embodiments, the statistical play data may be also be grouped by particular years or seasons. For example, the statistical play data for the Oakland Raiders may be grouped by seasons from 2010 to 2018.

In some embodiments, the plays for each down and yardage requirement at various field positions may be determined and counted. The statistical play data may be further organized by downs, yardage requirements, and field positions. In some embodiments, all first down plays, second down plays, third down plays, and fourth down plays may be determined and grouped based on yardage requirements. For example, all second down plays with 10 yards to the first-down line (2nd and 10) may be grouped. The system may similarly group all 2nd and 9 plays, 2nd and 8 plays, 2nd and 7 plays, and so on. In some embodiments, the plays may be grouped by ranges of yardage requirements. For example, second down plays with 0-2 yards to go may be grouped, second down plays with 2 or more to 6 yards to go may be grouped, second down plays with 6 or more to 10 yards may be grouped, and second down plays with 10 or more yards to go may be grouped. The ranges of yard requirements may be determined based on a number of different features or characteristics.

The statistical play data may be further organized by ranges of field positions. The ranges of field position may vary in size and may vary between different profiles. For example, the relevant yard ranges for the Oakland Raiders profile may be the 0 to 20 yard line up-field, the 20 to 50 yard line up-field, the 50 to 30 yard line down-field, the 30 to 10 yard line down-field, and the 10 yard line to the goal line down-field. The statistical play data may be organized into additional groups or fewer groups than those described. Additional groups may include ranges of in-game clock time and weather conditions.

Play statistics for each play profile may then be determined based on the groupings. The proportion of various play types within each grouping may be determined. For example, the percentage of occurrence of each play type that occurs at various down and yardage requirements at various field positions may be determined. For example, the Oakland Raiders profile may indicate that on when the team is within the down-field 20 yard line to 10 yard line on third down with 6 or more to 10 yards to go, the team passes the ball 90% of the time, runs the ball 9% of the time and attempt a field goal 1% of the time.

At step 604, a play profile is assigned to at least one team of the virtual sporting event. For example, the Oakland Raiders play profile may be assigned to one of the teams of the virtual sporting event. Thus, when the assigned team is on offense, method 600-A will be used to select event segments for the assigned team. In some embodiments, both teams in the virtual sporting event may be assigned a play profile. In some embodiments, more than one play profile may be assigned to a particular team. If more than one play profile is assigned to a particular team, the play statistics for groupings in both profiles may be combined. As such, it is possible to create a game between two existing teams based on the statistically likely decisions that would be made by such teams in a desired year or season.

At step 606, the current virtual statistical play data is received. As previously described, the event data module may aggregate the virtual event data in selected event segments to derive the current virtual statistical play data, such as at operation 406. The current virtual statistical play data may indicate that the assigned team is on offense. If the assigned team is currently on offense, then a set of valid event segments for the current time segment is received at step 608. The set of valid event segments may be identified at operation 402 as previously described.

At step 610, the probabilities of possible subsequent plays are determined based on the play statistics of the assigned play profile. In various embodiments, the segment selection module may reference the statistical play data processed at step 602 to determine the probabilities of possible subsequent plays based on the current virtual statistical play data. For example, if the current virtual statistical play data indicates that the ball is at the 12 yard line during a third down, then the segment selection module references the percentages of each play type in the assigned profile in that situation (down, yard requirement, and field position). In the present example, the assigned Oakland Raiders profile would indicate a 90% chance for selecting a pass play, a 9% chance of selecting a run play, and a 1% chance of selecting a field goal attempt.

Method 600-A may then proceed to step 612 to determine a play type based on the probabilities determined at step 610. In the present example, the segment selection module may determine a play type from a pass play, run play, or a field goal attempt. The likelihood that each type of play will be determined may be based on the determined probabilities. Thus, there would be a 90% chance of selecting a pass play, a 9% chance of selecting a run play, and a 1% chance of selecting a field goal attempt.

At step 614, method 600-A selects a valid event segment that includes identified characteristics or classified categories that correspond to the determined play type. In some embodiments, an event segment corresponding to such play type is randomly selected from the set of valid event segments. In some embodiments, a subset of valid event segments that correspond to the determined play type may be determined and a single event segment is selected from the subset based on additional factors or by other segment selection methods.

Alternatively, method 600-A may then proceed to step 616 to determine a subset of valid event segments that correspond with the play types determined at step 610. The play types represented in the subset of valid event segments may be in proportion to the probabilities determined at step 610. The segment selection module may filter the set of valid event segments by identifying a filtered subset of valid event segments that include plays in proportion with the determined probabilities. In some embodiments, the segment selection module may identify a predetermined number of event segments. The predetermined number may be a maximum number. For example, the segment selection module may identify 100 event segments to select for a particular time segment. The 100 identified event segments will include a proportional amount of event segments corresponding to the probabilities of play types determined at step 610. Thus, in the present example, 90 out of the 100 identified event segments will correspond to pass plays, 9 out of 100 identified event segments will correspond to run plays, and 1 out of 100 identified event segments will correspond to field goal attempts.

In various embodiments, the filtered subset of event segments may be identified randomly. For example, the 90 event segments corresponding to pass plays may be randomly identified from the segment database. A valid event segment is then selected from the filtered set of event segments at step 616. For example, the valid event segment may be randomly selected from the filtered subset of valid event segments. In some embodiments, the selection may be further narrowed by other factors such as success rate of the play indicated by the event segment, or by another segment selection method.

In some embodiments, a Virtual Coach or Virtual Team algorithm may implement a neural network trained on data compiled for an existing coach or team to select event segments based on decisions corresponding to a combination of one or more teams or coaches. For example, training input may include values corresponding to various characteristics at a particular play in a historical sporting event, such as the clock time, the current score, the position on the field, and the down and yardage requirements. The training input may be input as a feature vector along with a known training output value corresponding to the type of play, such as a pass, run, etc. Based on the training data, the neural network may update weighted coefficients for each characteristic used in the training data. Once fully trained, the probabilities of various types of plays may be determined based on the weighted coefficients and characteristics indicated by the current statistical play data of the virtual sporting event.

Principled Play Selection

Figure 6B:
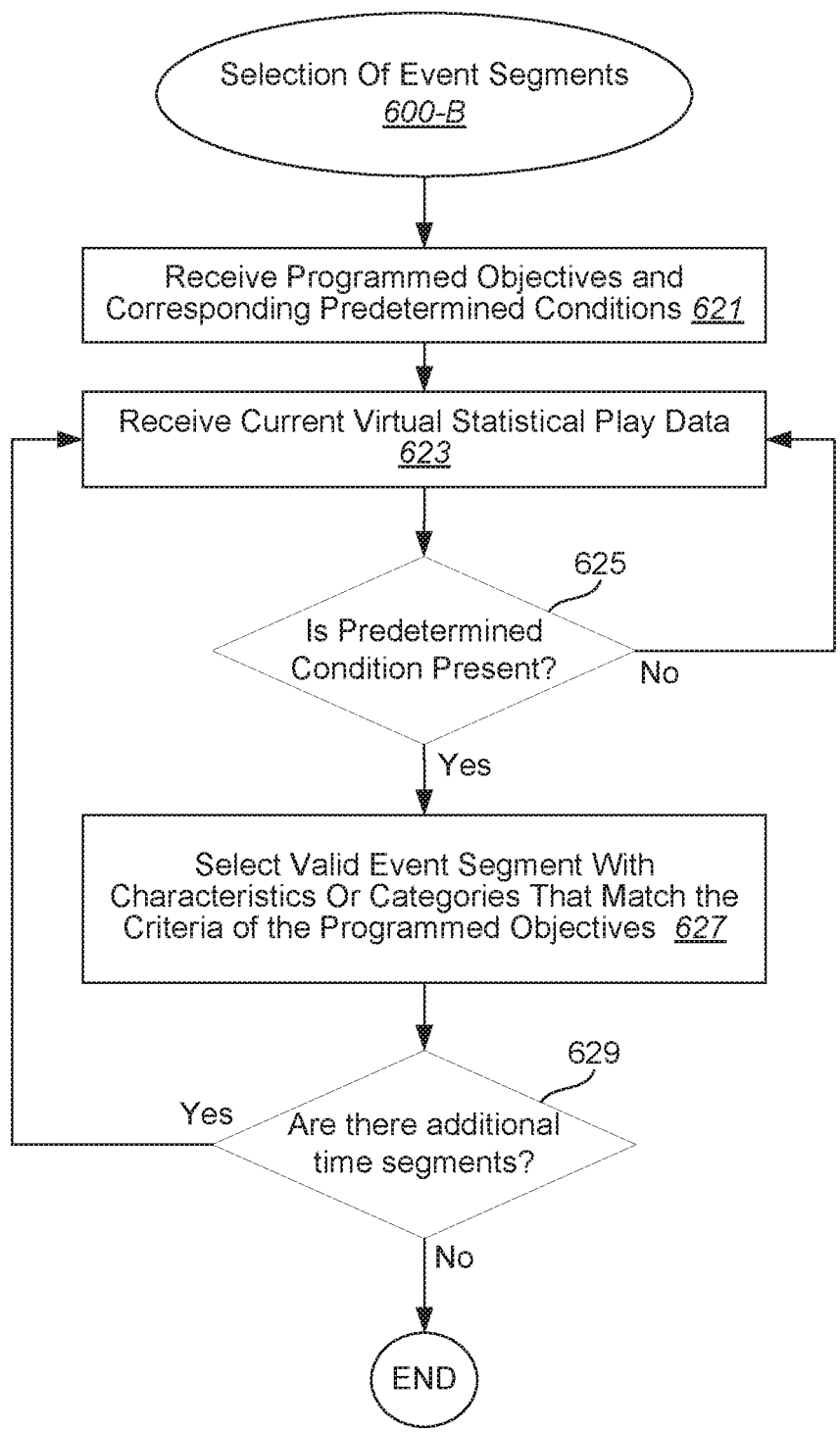
FIG. 6B illustrates an example Principled Play method for selection of event segments, in accordance with one or more embodiments.

A Principled Play method may be implemented to select event segments based on a combination of one or more specific programmed objectives. With reference to FIG. 6B, shown is an example Principled Play method 600-B for selection of event segments, in accordance with one or more embodiments. In some embodiments, the Principled Play algorithm selects event segments based on the classifications or characteristics of the event segments that support the programmed objectives.

At step 621, one or more programmed objectives are received, which may include corresponding predetermined conditions. For example, such programmed objectives may include selecting plays that generate the most yardage gained. The programmed objectives may include selecting plays with the most crowd excitement based on audio characteristics of crowd sound or social media posts. The programmed objectives may include selecting plays that result in the highest scores. The programmed objectives may include selecting plays under a certain length of time.

The predetermined conditions associated with the programmed objectives may identify qualifying events for the programmed objectives. For example, the programmed objectives may be desired to occur at particular downs in a virtual football game, such as to select plays that generate the most excitement during third down plays. As another examples, programmed objectives may be desired to occur with a particular amount of in-game clock time remaining, such as to select plays under a certain length of time when there are two minutes or less remaining in the clock time.

For example, the programmed objective may be to select event segments with third-down plays that generate the most yardage. The algorithm may then identify a group of all valid event segments corresponding to third-down plays that resulted in a gain of twenty or more yards.

At step 623, current virtual statistical play data is received. As previously described, the event data module may aggregate the virtual event data in selected event segments to derive the current virtual statistical play data, such as at operation 406. It is then determined whether a predetermined condition is present at 625. If the predetermined condition is not present, method 600-B may return to step 623 to continue receiving virtual statistical play data as event segments are selected via other segment selection methods. If the predetermined condition is present, method 600-B proceeds to step 627 to select a valid event segment that includes characteristics or categories that match the criteria of the programmed objectives. In some embodiments, there may be no predetermined conditions and the programmed objectives may apply to all time segments. As such, in some embodiments, step 625 may be an optional step.

At step 627, a valid event segment with characteristics or categories that match the criteria of the one or more programmed objectives is selected. The characteristics or categories of each valid event segment may be identified and classified, respectively, during the segmentation process of method 300. In some embodiments, an event segment with matching criteria may be randomly selected from the set of valid event segments. In some embodiments, additional programmed objectives may be applied. The identified group of all valid event segments may be narrowed down by programmed objectives until a single event segment can be identified. In some embodiments, the Principled Play algorithm implements a predetermined hierarchy of programmed objectives. In some embodiments, an event segment may also be selected from the set of valid event segments based on implementation of other segment selection method described herein.

It is then determined whether there are additional time segments at 629. If there are additional time segments requiring event segments to be selected, then method 600-B may return to step 623 to receive additional virtual statistical play data for subsequent time segments. If all event segments have been selected for all time segments, then method 600-B ends.

Interactive Play Selection

Figure 6C:
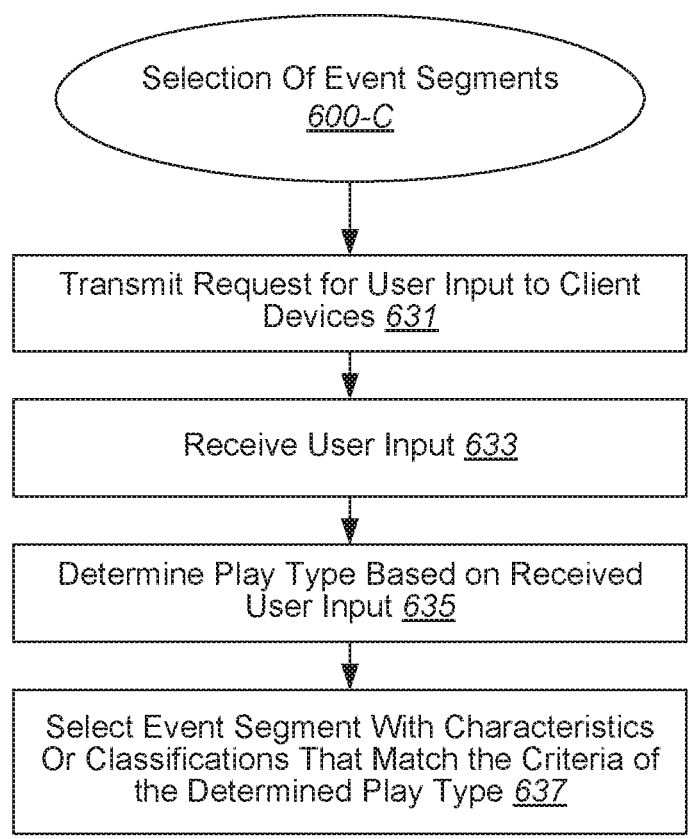
FIG. 6C illustrates an example Interactive Play method for selection of event segments, in accordance with one or more embodiments.

An Interactive Play algorithm may select event segments based on external input, such as that received by users listening to the virtual sporting event. For example, users, such as user 279, may use corresponding client devices, such as client device 278, to input vote selections on the type of play to be selected for a subsequent time segment. With reference to FIG. 6C, shown is an example Interactive Play method 600-C for selection of event segments, in accordance with one or more embodiments. Although method 600-C described with reference to desired play types, it should be recognized that method 600-C may be implemented to select event segments correspond to a number of other types of desired characteristics, such as players involved in a play, penalty calls, player substitutions, etc.

At step 631, a request for user input is transmitted to one or more client devices. In some embodiments, client device 278 may be any one of client devices 102-108 described with reference to FIG. 1. The request may comprise audio and/or visual prompts to the user. For example, the request of user input may comprise text which may display at the client devices via an application or web browser to request user input corresponding to a selection for one or more play types or strategies, such as pass plays, run plays, etc. The request for user input may display selection options on the client device. For example, the request may display a selection for a run play and a selection for a pass play. As such, the user input may be an indication of a manual selection. The request may also comprise accompanying audio or video instructions for the user selection. As another example, the request may request audio user input. For example, the request may prompt users to cheer or yell if a pass play is desired, or to boo or jeer if a particular action in the virtual sporting event is desired.

The request may be transmitted only to client devices corresponding to users that meet predetermined criteria. For example, requests may only be transmitted to users who have registered through an application. As another example, advertising data may be used to identify users eligible to receive requests for user input, such as users who have recently purchased fuel at participating gas stations.

At step 633, user input is received at the system. The input may be received at anyone of various components of system 200 via network 110. Such input may be transmitted via the network to segment selection module 240 or other client device interface. In some embodiments, such input may be transmitted via the network to biasing module 290, which will be further described below. Such user input may be a user selection in an application executed on the client device. In some embodiments, input may be audio input received at the client device, such as cheering, or yelling confirmation for a particular play type. The input may also be received as a text message or voice call sent via the client device. The manner of receiving user input may be chosen by user activity while listening to the virtual sporting event. For example, a user may be listening while driving in an automobile. The application may provide an option for receiving audio input, which may require limited physical or visual interaction with the client device. In other embodiments, the application may request confirmation that the user is a passenger or not currently driving before input may be received.

At step 635, the desired play type is determined based on the received user input. Audio input may be processed by voice or speech recognition techniques to determine whether the nature of the user input, such as whether they comprise cheers or jeers. The desired play type may be determined based on various predetermined requirements or thresholds.

In some embodiments, the selection option corresponding to the majority of user input may determine the desired play type. In some embodiments, a desired play type may be determined if user input exceeds a predetermined threshold. For example, if user input is received from more than 50% of client devices executing applications for receiving the virtual sporting event, then the play type corresponding to the user input may be determined to proceed.

An event segment with characteristics or classifications matching the criteria of the determined play type is selected at step 637. For example, the majority of user input may indicate a selection for a team to pass on the next fourth down. As such, the Interactive Play algorithm may identify valid event segments corresponding to pass plays. A pass play event segment may then be selected randomly or based on another segment selection algorithm as described herein.

Exhaustive Play Selection

Figure 6D:
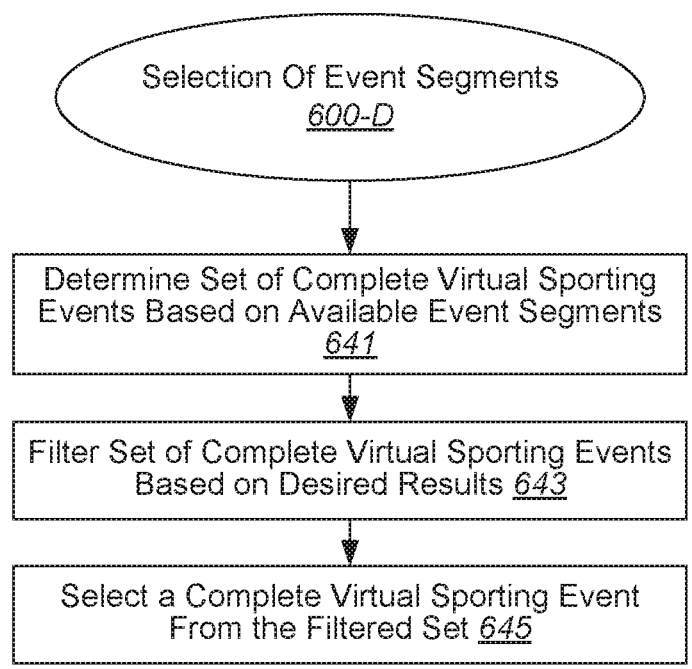
FIG. 6D illustrates an example Exhaustive Play method for selection of event segments, in accordance with one or more embodiments.

An Exhaustive Play algorithm may be implemented to determine an exhaustive set of complete virtual sporting events based on all possible combinations of available event segments. With reference to FIG. 6D, shown is an example Exhaustive Play method 600-D for selection of event segments, in accordance with one or more embodiments.

At step 641, a set of one or more complete virtual sporting events is determined based on available event segments. For example, a first event segment corresponding to the first play of a virtual football game may be selected for a first time segment (t). In some embodiments, one of the various segment selection methods described herein may be implemented to select event segments for each time segment of the virtual sporting events in the set. Once an event segment is selected for a time segment (t) by one or more of the segment selection methods, constraints for the subsequent time segment (t+1) may be identified based on the selected event segment for time segment (t), at operation 402. A separate virtual sporting event may be created for each possible event segment that may be selected for a subsequent time segment (t+1). As such, method 400 may repeat operations 402 and 404 for each generated virtual sporting event until event segments have been selected for each time segment of all possible virtual sporting events.

At step 643, the set of complete virtual sporting events is filtered based on desired results. The exhaustive set of complete virtual sporting events may then be evaluated based on a combination of various desired results, such as outcome, excitement level, etc. For example, a complete virtual sporting event may be selected from the exhaustive set based on the result that the outcome of the game is determined by the final play. The set of all possible complete virtual sporting events may be filtered to obtain a subset of complete virtual sporting events with outcomes that are determined by the final play. Then a complete virtual sporting event may be selected from the filtered subset at step 645. A complete virtual sporting event may be selected at step 645 at random or based on other desired results, such as victory by a particular team.

Manipulation of Virtual Event Outcomes

Figure 7A:
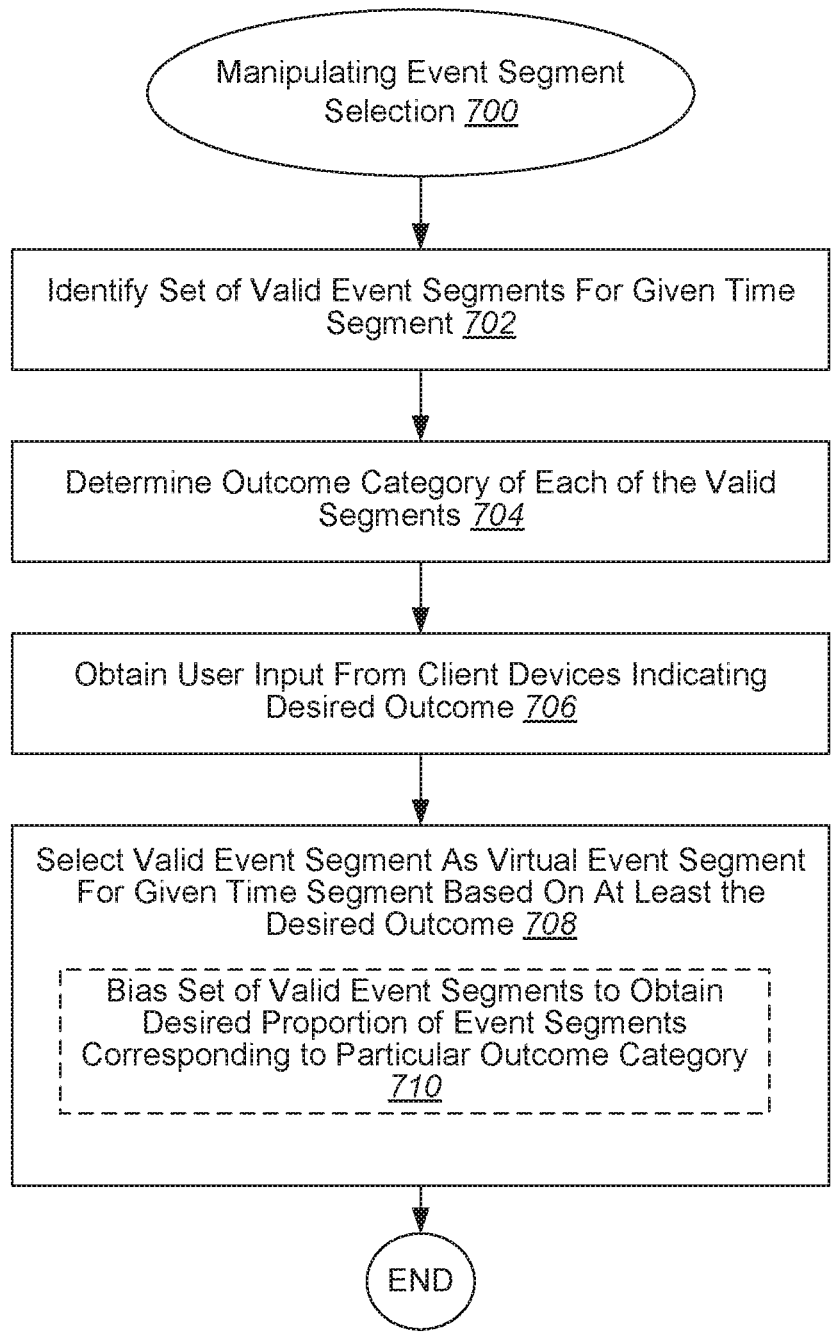
FIG. 7A illustrates an example process for manipulating selection of event segments based on audience input, in accordance with one or more embodiments.
Figure 7B:
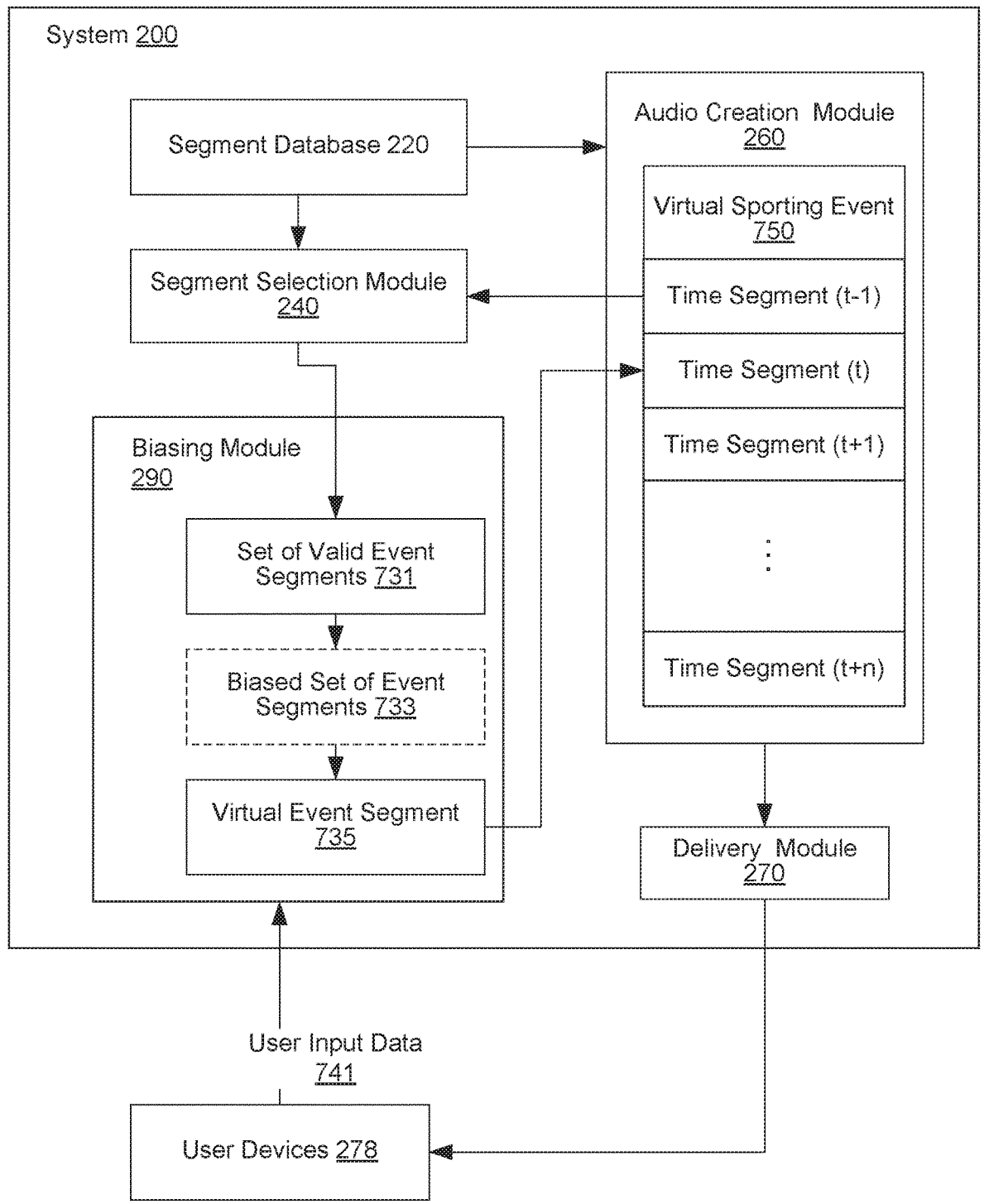
FIG. 7B illustrates a process flowchart for manipulating event segment selection, in accordance with one or more embodiments.

In some embodiments, input from client devices may also be used by virtual event system 200 for controlling or changing the outcome of the virtual sporting events. Such input, or external stimulus, may be used to alter the selection of event segments used for one or more time positions of the virtual event. The external stimulus may be applied before the start of the virtual sporting event or during the virtual sporting event. With reference to FIG. 7A, shown is an example process 700 for manipulating selection of event segments based on audience input, in accordance with one or more embodiments. FIG. 7B illustrates a process flowchart for manipulating event segment selection, in accordance with one or more embodiments.

In certain embodiments, such biasing of selected event segments may be implemented in conjunction with, or as part of, an Interactive Play method, such as method 600-C, for selection of event segments. However, in some embodiments, process 700 may be implemented with various other segment selection mechanisms described herein. For example, audience members may be directed to provide user input to increase the chances of a successful play to be selected for a particular event segment. In some embodiments, if the amount of user input exceeds a predetermined threshold, the segment selection module may bias the segment selection by increasing the ratio of successful plays to unsuccessful plays. As such, there would be a greater chance that a successful play is selected.

As another example, a coin flip at the start of a virtual football game may be affected by user input. Typically the odds of the coin landing on heads would be 50%. However, user input may affect the segment selection module choice to selecting a resulting heads flip 60% of the time. As another example, when event segments are identified or selected, such as at operations 402 or 404, there may be several possible event segments that may be selected. Biasing based on user input may be implemented to increase the likelihood of choosing an event segment corresponding to a successful play. This may provide incentive for listening users to participate and provide user input to obtain higher odds for their desired outcome.

As shown in FIG. 7B, virtual sporting event 750 is generated by system 200. Virtual sporting event 750 may comprise a plurality of time segments, including at least time segment (t−1) to time segment (t+n). As shown, and as previously described, segment selection module 240 and biasing module 290 are configured to select event segments as virtual event segments 735 for each time segment of virtual sporting event 750. As virtual event segments 735 are selected, the event segments are retrieved from segment database 220 to generate virtual sporting event 750 at audio creation module 260 and the corresponding audio component is transmitted to user devices 278 via delivery module 270. FIGS. 7A and 7B will be described with reference to selecting an event segment for a current time segment (t).

At operation 702, one or more event segments are identified as a set of valid event segments 731 for a given time segment of the virtual sporting event. The set of valid event segments 731 may be identified based on event-specific constraints, such as at operation 402. Alternatively, the set of valid event segments 731 may be identified based on one or more event selection algorithms, as described with reference to operation 404 (i.e., methods 600-A, 600-B, and 600-C). In some embodiments, the set of valid event segments 731 may be identified by a combination of operations 402 and 404.

For example, a set of valid event segments may be first identified based on event-specific constraints corresponding to the virtual event segment selected for the previous time segment (t−1), as described with respect to operation 402. In some embodiments, the set of valid event segments may be further refined by one or more of the segment selection algorithms described above to provide a subset of valid event segments.

As an illustrative example, virtual event data corresponding to the virtual event segment selected for previous time segment (t−1) may indicate that the ball is on the down-field 15 yard line at 3rd down. As such, segment selection module 240 identifies a set of valid event segments corresponding to plays starting at or near the 15 yard line. Alternately, or additionally, the set of valid event segments may correspond to 3rd down plays.

Next in the example, segment selection module 240 may implement a Virtual Team method to refine the set of valid event segments, such as via the Oakland Raiders play profile. As in the example above, the Oakland Raiders play profile indicates that when the team is within the down-field 20 yard line to down-field 10 yard line on third down with 6 to 10 yards to go, the team passes the ball 90% of the time, runs the ball 9% of the time and attempt a field goal 1% of the time.

As such, segment selection module 240 may refine the set of valid event segments 731 to include 90% pass plays, 9% run plays and 1% field goal attempts, all of which start at or near the 15 yard line on 3rd down. Alternatively, segment selection module may select a play type based on the probabilities of play types. For example, segment selection module 240 may determine that a pass play will be selected for current time segment (t). Thus, the set of valid event segments 731 may be refined to include only pass plays that start at or near the 15 yard line on 3rd down.

At operation 704, an outcome category for each of the valid event segments is determined. As previously described, each event segment identified in segment database 220 may be classified into one or more categories. The outcome category of each valid event segment may indicate an outcome of a play corresponding to the valid event segment. For example, plays resulting in a positive gain of yards may be classified into successful play category, while plays resulting in a negative gain of yards may be classified into a failed play category. Such classifications may take into account yardage gained or lost due to penalties. Outcome categories may include further granularity by indicating amount of yards gained, which may further be grouped into ranges. Outcome categories may also include whether the event segment corresponds to a scoring play. The event segments may be classified into various other outcome categories based on corresponding statistical play data.

At operation 706, user input 741 is obtained from client devices, such as client device 278, associated with audience members. The user input may indicate a desired outcome for the virtual sporting event, or a given time segment of the virtual sporting event. The user input may correspond to audience participation or audience feedback data. Similar to the external input received for the Interactive Play method for segment selection, a request for user input may be transmitted to the one or more client devices. In some embodiments, requests may prompt audience members to input various forms of information.

For example, listeners may be required execute an application on the corresponding client device in order to receive and listen to the transmitted virtual sporting event 260. In some embodiments, listeners may be prompted to register user profiles in the application, and provide various types user information such as age, gender, location, and interests. A listener may also indicate which teams he or she supports in the user profile. In some embodiments, credit card information or other payment information may be saved for payment requirements, such as in-application purchases, subscriptions, etc. Other user information may include other registrations to related advertising partners or ownership of products corresponding to advertising partners.

Prompts for any combination of the abovementioned user information may be transmitted to client devices via other means, such as via email, text message, etc. For example, permission to access location information from the client device may be requested. Other user input may include audio input received from the client device, such as cheers, jeers, yelling, etc.

Other user input may include wagers placed to indicate support for a given team, or placed on the outcome of the virtual sporting event or of various plays or other events in the virtual sporting event, such as a coin flip at the beginning of a football game, or the result of the jump ball at the beginning of a basketball game. In some embodiments, wagers may be placed as donations to charitable causes. For example, listeners may agree to donate an amount of money to a charitable cause based on the outcome of the virtual sporting event or particular play. As another example, all submitted wagers may be aggregated and a particular charitable cause may be selected based on the outcome of the virtual sporting event.

The audience feedback or audience participation data may indicate a desired outcome for the given time segment. For example, the desired outcome may correspond to a successful play, a failed play, a scoring play, etc. The desired outcome may be indicated by any combination of one or more of the user input received.

In particular embodiments, the desired outcome may be indicated by the total number of current listeners that support a particular team. This may be based on which team has the majority of supporters currently listening to the virtual sporting event. For example, if Team A has more current audience members registered as supporters than Team B at a given time, then there may be an increased chance that the event segment selected for time segment (t) will include a successful play for Team A. Alternatively, if Team A has the majority of supporting listeners, then there may be an increased chance that the selected event segment will include a failed play for Team B.

In some embodiments, the desired outcome may be indicated by the number of current audience members listening from a particular location. For example, the commentary in the transmitted audio component may report that the number of audience members listening from a particular city or geographic above a predetermined threshold will provide a successful outcome for a particular team.

In some embodiments, the listeners supporting a particular team that generate the loudest cheering audio through the client devices will indicate a positive outcome for that particular team. As previously described, the client devices may be configured to collect audio input for receiving audio data from listeners. In some embodiments, the audio data is received at biasing module 290. In some embodiments, the audio data is received at interactive audio module 280. The audio data received at system 200 may be associated with the user profile indicating the team preference. In some examples, biasing module 290 is configured to determine the volume level of audio data received from each client device and calculate which team's supporters provided the loudest audio input. This may be a cumulative volume level of supporters for each team.

In some embodiments, the desired outcome may be indicated by the number of current listeners who post on social media. User input may correspond to social media posts relating to the virtual sporting event 750. Such social media data maybe identified by hashtags or other forms of tagging and received at system 200. In some embodiments, the desired outcome may be indicated by the amount of wagers submitted supporting a given team or outcome.

In yet further embodiments, the desired outcome may be indicated by the number of current listeners with a connection to an advertising partner. For example, a particular automobile brand may sponsor a particular team. Listeners may indicate the make of their vehicle through an application or other transmission from the corresponding client device. As such, the number of listeners that own cars with a make corresponding to the particular automobile brand may determine or affect a desired outcome for the team supported by the automobile brand.

At operation 708, a valid event segment 731 is selected as a virtual event segment 735 for the current time segment (t) based on at least the desired outcome. In some embodiments, biasing module 290 selects a valid event segment with an outcome category corresponding to the desired outcome determined at operation 706.

As an illustrative example, the desired outcome determined at operation 706 is a scoring play for Team A. In the example above in which the set of valid event segments 731 includes only pass plays determined by the Virtual Team method, biasing module 290 may select a valid event segment from set 731 corresponding to a pass play that results in a score for Team A. The scoring pass play may be selected at random from the set of valid event segments, or based on other considerations described herein.

In some embodiments, the set of valid event segments 731 may be biased to obtain a desired proportion of event segments with a particular outcome category. This may result in a biased set of event segments 733 with a desired proportion of event segments with outcome categories corresponding to the desired outcome.

As previously described, the set of valid event segments 731 may be refined to include only pass plays that start at or near the 15 yard line on 3rd down. Biasing module 290 may further refine the set of valid event segments such that the biased set of event segments 733 includes only pass plays that result in a score. Virtual event segment 735 may then be selected at random from the biased set 733. As another example, biasing module 290 may refine the set of valid event segments 731 such that the biased set 733 includes at 70% of event segments resulting in a score. The remaining event segments may be a combination of failed plays and successful plays that do not result in a score.

The desired proportion may be determined by the nature of the user input indicating audience participation. A larger quantity of user input received from supporters of a particular team may increase the desired proportion of successful plays in the valid event segments 731. For example, the initial proportion of successful plays may be 50%, or a 1:1 ratio of successful plays to failed plays. If 10% more of the user input is received by listeners supporting Team A, then the proportion of successful plays in set 731 may be increased by 10% to 60%. Alternatively, the proportion of successful plays may be increase by some factor, such as 1.5 times the percentage majority, which would be 15% in the example.

Alternatively, the set of valid event segments 731 may include event segments comprising of 90% pass plays, 9% run plays and 1% field goal attempts, all of which start at or near the 15 yard line on 3rd down. Biasing module 290 may refine the set of valid event segments 731 such that event segments corresponding to each type of play includes at least a particular percentage categorized as a scoring play. Thus, the proportion of each type of play remains the same, while the percentage of scoring plays in each play type category is increased.

Figure 8A:
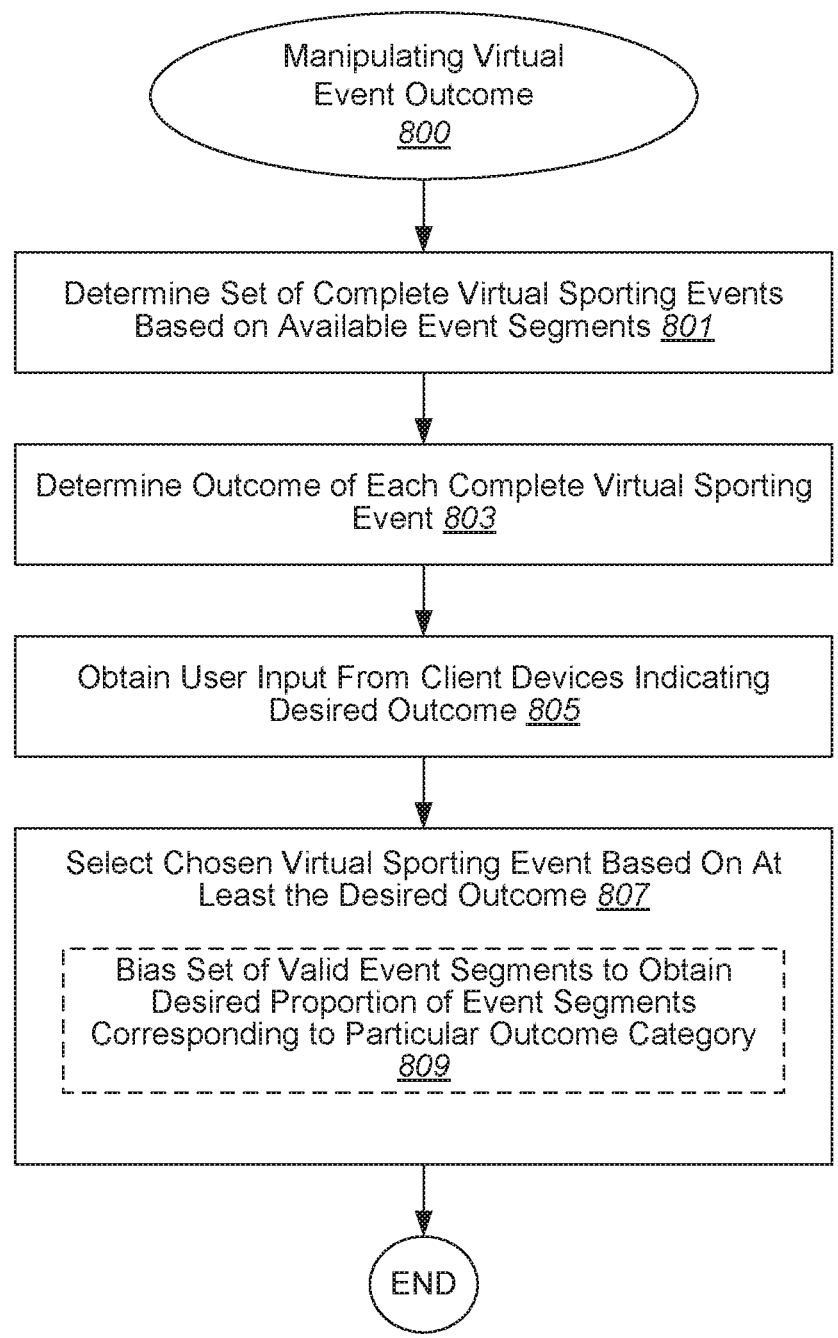
FIG. 8A illustrates an example method for manipulating the outcome of a virtual sporting event based on audience input, in accordance with one or more embodiments.
Figure 8B:
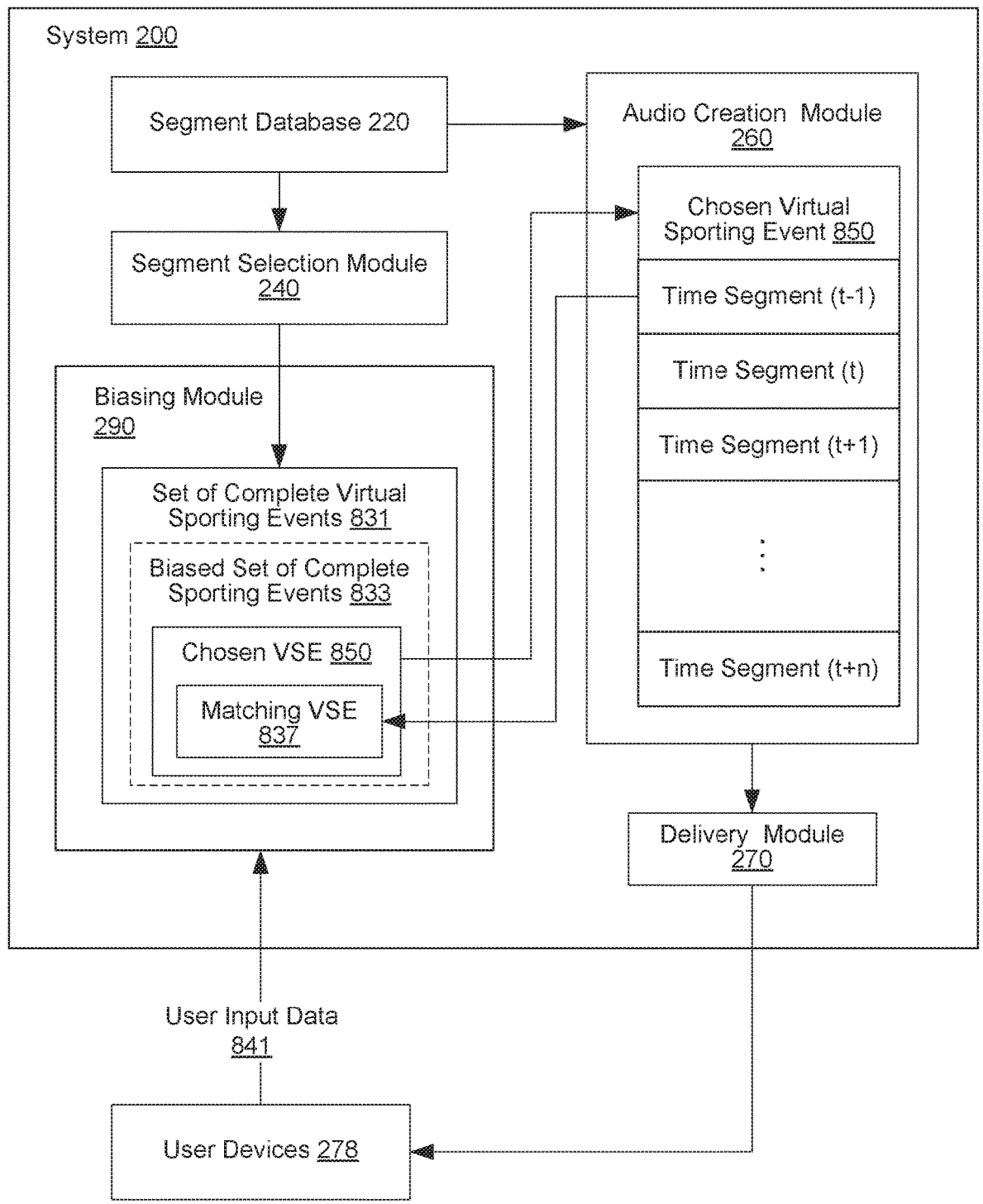
FIG. 8B illustrates a process flowchart for manipulating virtual sporting event outcomes, in accordance with one or more embodiments.

With reference to FIG. 8A, shown is an example method 800 for manipulating the outcome of a virtual sporting event based on audience input, in accordance with one or more embodiments. FIG. 8B illustrates a process flowchart for manipulating virtual sporting event outcomes, in accordance with one or more embodiments. In some embodiments, method 800 may be used to select a complete virtual sporting event (VSE) based on the outcome of the complete virtual sporting event. As such, a set of complete virtual sporting events is determined at operation 801. For example, system 200 may implement an Exhaustive Play method of segment selection to determine a set of complete virtual sporting events 831, as described with reference to FIG. 6D. Referring to FIG. 8B, segment selection module 240 may implement method 600-D to determine a set of complete virtual sporting events based on all possible combinations of available event segments stored in segment database 220.

At operation 803, the outcome of each complete VSE is determined. Virtual event information may be mapped to each of the complete VSE in set 831. Virtual statistical play data for each complete virtual sporting event may be aggregated from the virtual event information to determine the outcome of the complete VSE, such as which team is the winning team. In some embodiments, the outcome of a particular event in the complete VSE may be determined at operation 803, such as the outcome of the coin flip at the beginning of a football game (i.e., head or tails), the kickoff team and receiving team for the kickoff at the first half or the second half of a football game, the result of the kickoff (i.e., the kickoff return yardage).

At operation 805, user input 841 is obtained from client devices, such as client device 278, associated with audience members. As described with reference to user input 741 at operation 706, user input 841 may indicate a desired outcome for the VSE, or a given time segment of the VSE. In a first example, a desired outcome of a victory for Team A may be determined by user input indicating a majority of wages were placed for Team A. As a second example, the user input may indicate a desired outcome that Team A receives the kickoff at the beginning of a football game.

At operation 807, a complete VSE is selected as a chosen VSE 850 based on at least the desired outcome. Based on the first example above, biasing module 290 may select a complete VSE from set 831 which results in a victory for Team A. Based on the second example above, biasing module 290 may select a complete VSE from set 831 which has Team A receiving the kickoff at the beginning of the game. In some embodiments, this may occur by assigning Team A to the receiving team of an already selected chosen VSE.

In some embodiments, the set of complete VSEs 831 may be biased to obtain a desired proportion of complete VSEs with a particular outcome. This may result in a biased set of VSEs 833 with a desired proportion of VSEs with outcomes corresponding to the desired outcome. Based on the first example above, biasing module 290 may refine set 831 to obtain a biased set 833 which includes a predetermined proportion of VSEs resulting in a victory for Team A. The predetermined proportion may be any percentage, including up to 100%. The predetermined proportion may be based on the quantity or nature of the user input received at operation 805. Then chosen VSE 850 may be selected from the biased set 833 at random, or based on other considerations.

Chosen VSE 850 may then be transmitted to audio creation module 260 which may retrieve the appropriate event segments from segment database 220 to generate video and audio components for chosen VSE 850. Audio creation module 260 may then transmit the audio component to user devices 278 via delivery module 270.

In some embodiments, selection of a complete VSEs based on user input may be implemented in real-time. In other words, after a particular chosen VSE 850 is selected, a different complete VSE may be selected from set 831 or 833 based on user input during the transmission of event segments corresponding to the time segments.

Because the complete VSEs in set 831 comprise all possible combinations of available event segments, there may be groupings of one or more complete VSEs with matching sequences of event segments up until a particular time segment. As each time segment progresses to the next, the number of complete VSEs with matching sequences will decrease. When a chosen VSE 850 is selected to be transmitted to audio creation module 260, segment selection module 240 or biasing module 290 may track the group 837 of VSEs that match chosen VSE 850. As video components or audio components of chosen VSE 850 are created, such as for time segment (t−1), at audio creation module 260, biasing module 290 is updated to remove VSEs from group 837 that branch away from the sequence of the chosen VSE 850 at time segment (t−1).

A desired outcome may then be determined at operation 805 for a time segment occurring after segment (t−1). If chosen VSE 850 includes the desired outcome, then no change may be made. However, if chosen VSE 850 does not include the desired outcome, then biasing module 290 may select a different VSE from group 837 as chosen VSE 850. As previously described, biasing module may select a different VSE with the appropriate outcome, or may bias group 837 to include a desired proportion of matching VSEs with the appropriate outcome.

For example, while an audio component for a chosen VSE 850 is being transmitted to client devices 278, received user input may indicate a desired outcome of Team A completing a successful kickoff return at the start of the second half. Biasing module 290 may then determine whether the current chosen BSE 850 results in this desired outcome. If it does, then no change will be made to the currently chosen VSE 850. However, if the currently chosen VSE 850 does not include the desired outcome, biasing module 290 may select a matching VSE from group 837 that does include the desired outcome as a new chosen VSE 850.

Example Systems

Various computing devices can implement the methods described herein. For instance, a mobile device, computer system, etc. can be used to generate dynamic ETA predictive updates. With reference to FIG. 9, shown is a particular example of a computer system 900 that can be used to implement particular examples of the present disclosure. According to particular example embodiments, a system 900 suitable for implementing particular embodiments of the present disclosure includes a processor 901, a memory 903, a transceiver 909, an interface 911, and a bus 915 (e.g., a PCI bus). When acting under the control of appropriate software or firmware, the processor 901 is responsible for processing inputs through various computational layers and algorithms in a neural network. In some embodiments, the processor is responsible for updating the parameters of each computational layer using algorithms, including but not limited to, a stochastic gradient descent algorithm and a back propagation algorithm. Various specially configured devices can also be used in place of a processor 901 or in addition to processor 901. The complete implementation can also be done in custom hardware.

The interface 911 is typically configured to send and receive data packets or data segments over a network. Particular examples of interfaces the device supports include Ethernet interfaces, frame relay interfaces, cable interfaces, DSL interfaces, token ring interfaces, and the like. The interface 911 may include separate input and output interfaces, or may be a unified interface supporting both operations. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

Transceiver 909 is typically a combination transmitter/receiver device. However system 900 may include a transmitter and a receiver as separate components in some embodiments. Transceiver 909 may be configured to transmit and/or receive various wireless signals, including Wi-Fi, Bluetooth, etc. In some embodiments, system 900 may function as a client device or location sensor or beacon to track location of an individual via wireless signals. The connection or communication between a client device and a beacon may indicate the presence of the corresponding individual in a particular location. In various embodiments, transceiver 909 may operate in a half duplex or full duplex mode. Various protocols could be used including various flavors of Bluetooth, Wi-Fi, light of sight transmission mechanisms, passive and active RFID signals, cellular data, mobile-satellite communications, as well as LPWAN, GPS, and other networking protocols. According to various embodiments, the transceiver may operate as a Bluetooth or Wi-Fi booster or repeater.

According to particular example embodiments, the system 900 uses memory 903 to store data and program instructions for operations including processing video and audio data or files. Such operations may also include training a neural network, or selecting event segments, such as described in method 400 and methods 600-A, 600-B, 600-C, and/or 600-D. The program instructions may control the operation of an operating system and/or one or more applications, for example. The memory or memories may also be configured to store received metadata and batch requested metadata. The memory or memories may also be configured to store data corresponding to parameters and weighted factors.

In some embodiments, system 900 further comprises a graphics processing unit (GPU) 905. The GPU 905 may be implemented to process video and images of original content data, such as at operations 304, 306, 310, 312, 314, and 408 among others. In some embodiments, system 900 further comprises an accelerator 907. In various embodiments, accelerator 907 is a rendering accelerator chip, which may be separate from the graphics processing unit. Accelerator 907 may be configured to speed up the processing for the overall system 900 by processing pixels in parallel to prevent overloading of the system 900. For example, in certain instances, ultra-high-definition images may be processed, which include many pixels, such as DCI 4K or UHD-1 resolution. In such instances, excess pixels may be more than can be processed on a standard GPU processor, such as GPU 905. In some embodiments, accelerator 907 may only be utilized when high system loads are anticipated or detected.

In some embodiments, accelerator 907 may be a hardware accelerator in a separate unit from the CPU, such as processor 901. Accelerator 907 may enable automatic parallelization capabilities in order to utilize multiple processors simultaneously in a shared memory multiprocessor machine. The core of accelerator 907 architecture may be a hybrid design employing fixed-function units where the operations are very well defined and programmable units where flexibility is needed. In various embodiments, accelerator 907 may be configured to accommodate higher performance and extensions in APIs, particularly OpenGL 2 and DX9.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Conclusion

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method comprising:
    identifying one or more event segments as a set of valid event segments for a given time segment of a virtual sporting event based on event-specific constraints;
    determining an outcome category for each valid event segment of the set of valid event segments, wherein the outcome category for each valid event segment indicates an outcome of a play corresponding to the valid event segment;
    obtaining audience input, over a network, from a plurality of client devices associated with a plurality of audience members, wherein the audience input indicates a desired outcome for the given time segment;
    selecting a valid event segment as a virtual event segment for the given time segment based on at least the desired outcome and the outcome category for each valid event segment; and
    mapping virtual event data to the selected virtual event segment.

2. The method of claim 1, wherein selecting a valid event segment as a virtual event segment comprises:
    biasing the set of valid event segments to obtain a biased set of valid event segments, wherein the biased set of valid event segments comprises a predetermined proportion of valid event segments with outcome categories corresponding to the desired outcome; and
    selecting the virtual event segment from the biased set of valid event segments.

3. The method of claim 2,
wherein each event segment of the one or more event segments comprises portions of reference content data, the reference content data comprising reference video, reference audio, and reference statistics of a plurality of original sporting events,
wherein each event segment of the one or more event segments comprises corresponding video data segments from the reference video, audio data segments from the reference audio, and statistical play data from the reference statistics, and
wherein each event segment of the one or more event segments are classified with one or more categories based on the portion of reference content data corresponding to the event segments, wherein the one or more categories includes the outcome category.

4. The method of claim 3, further comprising:
retrieving an event segment as a virtual event segment for each time segment of the virtual sporting event including retrieving the biased virtual event segment for the given time segment;
desensitizing each of the virtual event segments by at least partially removing color and sound from each of the virtual event segments;
mapping virtual event data to each of the virtual event segments, wherein the virtual event data comprises one or more selected from the group consisting of: virtual event audio and fictional character information; and
generating virtual event information for the virtual sporting event based on the mapped virtual event data and a progress of the virtual sporting event indicated by the virtual event segments.

5. The method of claim 4, wherein identifying the one or more event segments as the set of valid event segments comprises:
receiving historical play data corresponding one or more historical sporting events;
determining probabilities of occurrence for different play types at different progress points based on the historical play data;
for the given time segment,
determining a current progress point based on virtual event information for virtual event segments selected for one or more previous time segments; and
identifying the one or more valid event segments based on the probabilities of occurrence such that the set of valid event segments includes a proportion of valid event segments with play types corresponding to the probabilities of occurrence for different play types.

6. The method of claim 4, wherein identifying the one or more event segments as the set of valid event segments comprises:
receiving a programmed objective, wherein the programmed objective includes one or more predetermined conditions;
determining current virtual event information based on virtual event segments selected for previous time segments;
for the given time segment,
determining if the predetermined condition is satisfied based on the current virtual event information; and
if the predetermined condition is satisfied, identifying the one or more valid event segments based on the programmed objective such that each valid event segment includes a category that satisfies the programmed objective.

7. The method of claim 4, further comprising:
displaying the desensitized virtual event segments in conjunction with associated virtual event data and virtual event information;
obtaining narrative audio corresponding to the desensitized virtual event segments and corresponding virtual event data;
creating a virtual event audio file, the virtual event audio file including non-interactive audio including the narrative audio and corresponding virtual event audio; and
transmitting the virtual event audio file, via the network, to the plurality of client devices associated with the plurality of audience members.

8. The method of claim 7, wherein identifying the one or more event segments as the set of valid event segments comprises: for the given time segment,
obtaining audience feedback data from the plurality of client devices associated with the plurality of audience members, wherein the audience feedback data indicates a desired category; and
identifying one or more valid event segments that include a category corresponding to the desired category.

9. A method comprising:
generating a set of complete virtual sporting events, wherein each complete sporting event comprises a possible combination of event segments, the event segments being identified based on event-specific constraints, each event segment corresponding to a time segment of the respective complete virtual sporting event;
determining an outcome of each complete virtual sporting event in the set of complete virtual sporting events;
obtaining audience input, over a network, from a plurality of client devices associated with a plurality of audience members, wherein the audience input indicates a desired outcome;
selecting a complete virtual sporting event as a chosen virtual sporting event based on at least the desired outcome and the outcome of each complete virtual sporting event; and
mapping virtual event data to selected event segments in the selected complete virtual sporting event.

10. The method of claim 9, wherein selecting a complete virtual sporting event as the chosen virtual sporting event comprises:
biasing the set of complete virtual sporting events to obtain a biased set of complete virtual sporting events, wherein the biased set comprises a predetermined proportion of complete virtual sporting events with outcomes corresponding to the desired outcome; and
selecting the chosen virtual sporting event from the biased set of complete virtual sporting events.

11. The method of claim 9, further comprising:
retrieving the event segments corresponding to the chosen virtual sporting event as virtual event segments;
desensitizing each of the virtual event segments by at least partially removing color and sound from each of the virtual event segments;
mapping virtual event data to each of the virtual event segments, wherein the virtual event data comprises one or more selected from the group consisting of: virtual event audio and fictional character information; and
generating virtual event information for the chosen virtual sporting event based on the mapped virtual event data and a progress of the chosen virtual sporting event indicated by the virtual event segments.

12. A system comprising: one or more processors, memory, and one or more programs stored in the memory, the one or more programs comprising instructions for:
  identifying one or more event segments as a set of valid event segments for a given time segment of a virtual sporting event based on event-specific constraints;
  determining an outcome category for each valid event segment of the set of valid event segments, wherein the outcome category for each valid event segment indicates an outcome of a play corresponding to the valid event segment;
  obtaining audience input, over a network, from a plurality of client devices associated with a plurality of audience members, wherein the audience input indicates a desired outcome for the given time segment;
  selecting a valid event segment as a virtual event segment for the given time segment based on at least the desired outcome and the outcome category for each valid event segment; and
  mapping virtual event data to the selected virtual event segment.

13. The programmable device of claim 12, wherein selecting a valid event segment as a virtual event segment comprises:
  biasing the set of valid event segments to obtain a biased set of valid event segments, wherein the biased set of valid event segments comprises a predetermined proportion of valid event segments with outcome categories corresponding to the desired outcome; and
  selecting the virtual event segment from the biased set of valid event segments.

14. The programmable device of claim 13,
  wherein each event segment of the one or more event segments comprises portions of reference content data, the reference content data comprising reference video, reference audio, and reference statistics of a plurality of original sporting events,
  wherein each event segment of the one or more event segments comprises corresponding video data segments from the reference video, audio data segments from the reference audio, and statistical play data from the reference statistics, and
  wherein each event segment of the one or more event segments are classified with one or more categories based on the portion of reference content data corresponding to the event segments, wherein the one or more categories includes the outcome category.

15. The programmable device of claim 14, further comprising:
  retrieving an event segment as a virtual event segment for each time segment of the virtual sporting event including retrieving the biased virtual event segment for the given time segment;
  desensitizing each of the virtual event segments by at least partially removing color and sound from each of the virtual event segments;
  mapping virtual event data to each of the virtual event segments, wherein the virtual event data comprises one or more selected from the group consisting of: virtual event audio and fictional character information; and
  generating virtual event information for the virtual sporting event based on the mapped virtual event data and a progress of the virtual sporting event indicated by the virtual event segments.

16. The programmable device of claim 15, wherein identifying the one or more event segments as the set of valid event segments comprises:
  receiving historical play data corresponding one or more historical sporting events;
  determining probabilities of occurrence for different play types at different progress points based on the historical play data;
  for the given time segment,
    determining a current progress point based on virtual event information for virtual event segments selected for one or more previous time segments; and
    identifying the one or more valid event segments based on the probabilities of occurrence such that the set of valid event segments includes a proportion of valid event segments with play types corresponding to the probabilities of occurrence for different play types.

17. The programmable device of claim 15, wherein identifying the one or more event segments as the set of valid event segments comprises:
  receiving a programmed objective, wherein the programmed objective includes one or more predetermined conditions;
  determining current virtual event information based on virtual event segments selected for previous time segments;
  for the given time segment,
    determining if the predetermined condition is satisfied based on the current virtual event information; and
    if the predetermined condition is satisfied, identifying one or more valid event segments based the programmed objective such that each valid event segment includes a category that satisfies the programmed objective.

18. The programmable device of claim 15, further comprising:
  displaying the desensitized virtual event segments in conjunction with associated virtual event data and virtual event information;
  obtaining narrative audio corresponding to the desensitized virtual event segments and corresponding virtual event data;
  creating a virtual event audio file, the virtual event audio file including non-interactive audio including the narrative audio and corresponding virtual event audio; and
  transmitting the virtual event audio file, via the network, to the plurality of client devices associated with the plurality of audience members.

19. The programmable device of claim 18, wherein identifying the one or more event segments as the set of valid event segments comprises: for the given time segment,
  obtaining audience feedback data from the plurality of client devices associated with the plurality of audience members, wherein the audience feedback data indicates a desired category; and
  identifying one or more valid event segments that include a category corresponding to the desired category.

* * * * *